(12) United States Patent
Takayama et al.

(10) Patent No.: US 6,962,458 B2
(45) Date of Patent: Nov. 8, 2005

(54) COUPLING DEVICE FOR EQUIPMENT IMPLEMENT

(75) Inventors: Takemori Takayama, Hirakata (JP); Tetsuo Ohnishi, Yawata (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 10/255,170

(22) Filed: Sep. 26, 2002

(65) Prior Publication Data

US 2003/0150140 A1 Aug. 14, 2003

(30) Foreign Application Priority Data

Sep. 26, 2001 (JP) .......................................... 2001-294628

(51) Int. Cl.⁷ ................................................. E02F 9/28
(52) U.S. Cl. ........................................ 403/34; 403/150
(58) Field of Search ................................. 403/150, 158, 403/151, 152, 153, 157, 159, 161, 162, 34–39

(56) References Cited

U.S. PATENT DOCUMENTS

| | | | | | |
|---|---|---|---|---|---|
| 4,251,182 A | * | 2/1981 | Schroeder | ............... | 403/158 X |
| 5,290,617 A | * | 3/1994 | Mochizuki et al. | ........... | 428/67 |
| 5,630,673 A | * | 5/1997 | Krzywanos et al. | ........ | 403/158 |
| 6,283,667 B1 | * | 9/2001 | Neitzel | ....................... | 403/158 |
| 6,322,280 B1 | * | 11/2001 | Coyne | ......................... | 403/158 |
| 6,354,677 B1 | * | 3/2002 | Cook et al. | .................. | 305/122 |
| 6,428,744 B1 | * | 8/2002 | Takayama et al. | ............. | 419/2 |
| 2002/0155957 A1 | * | 10/2002 | Danly et al. | ................ | 508/103 |
| 2004/0157750 A1 | * | 8/2004 | Danly et al. | ................ | 508/103 |

FOREIGN PATENT DOCUMENTS

| | | | |
|---|---|---|---|
| JP | 56-152902 A1 | | 11/1981 |
| JP | 5-156388 A1 | | 6/1993 |
| JP | 11-2246 | * | 6/1997 |
| JP | 11-344034 | * | 6/1998 |
| JP | 11-117940 A1 | | 4/1999 |
| JP | 2001-271129 A1 | | 10/2001 |
| JP | 2002-180216 A1 | | 6/2002 |
| JP | 2003-342700 A1 | | 12/2003 |

* cited by examiner

*Primary Examiner*—John R. Cottingham
(74) *Attorney, Agent, or Firm*—Rader, Fishman & Grauer PLLC

(57) ABSTRACT

A coupling device for equipment implements is described, which coupling device does not impair the lubricity of bearing sections when the equipment is in service, does not cause seizure during rotation of bearings, does not need frequent feeding of grease to the bearing sections from outside, and provides good noise absorbability. The coupling device has such a structure that a metal based contact material 7 capable of storing a lubricating oil and/or lubricant is interposed between an implement bushing 1 made from steel and implement pin 4 of an implement for construction equipment.

27 Claims, 19 Drawing Sheets (a)

(b)

(a)

(b)

(c)

(a)

(b)

(c)

(a)

(b)

(a)

TEST CONDITIONS

MATING MATERIAL : SCM420 CARBURIZING AND QUENCHING
SURFACE HARDNESS $H_{RC}$60-62
SURFACE ROUGHNESS 2.5S OR LESS
LUBRICATING OIL : EO10   AMOUNT OF OIL : 250 CM³/MIN
OIL TEMPERATURE: 60°C
PERIPHERAL VELOCITY: 10M/SEC
SURFACE PRESSURE : MAX800KG/CM² (FOR EVERY 50KG/CM²)

SLIDING TEST SPECIMEN HOLDER (b)

① SHAFT: S45C + INDUCTION HARDENED MATERIAL
② BUSHING SPECIMEN
③ THERMOCOUPLE (a)

GREASE: LITHIUM GREASE
SWING ANGLE: 180°
ROTATIONAL SPEED: ± 6PRM
SURFACE PRESSURE: MAX 1000KG/CM²
MATING SHAFT MATERIAL: S45C + INDUCTION HARDENING (b)

(a)

(b)

ively. A detailed description of these common hardness
COUPLING DEVICE FOR EQUIPMENT IMPLEMENT

TECHNICAL FIELD

The present invention relates to a coupling device for implements of construction and earth-working equipment (e.g., hydraulic excavators and bulldozers).

DEFINITIONS

As used herein, the terms "Hv" and "HRC" serve as abbreviations for the common hardness standards "Vickers Hardness Scale" and "Rockwell C Hardness Scale", respectively. A detailed description of these common hardness standards and the methodology used in formulating the same may be found on pages 116–128 and 207–215, Section 3, Volume 3.01 of the Annual Book of American Society for Testing and Materials ("ASTM") Standards, published by the American Society for Testing & Materials (1997).

In addition, the phrases "a β phase" and "an α phase" refer to a crystalline structure of Cu—Al based sintered contact material. An in-depth description and understanding of these materials may be found on page 86, Table 53 of Dr. Max Hansen's "Constitution of Binary Alloys", published by McGraw-Hill Book Company, Inc. (1958).

BACKGROUND ART

As exemplified in FIG. 19(a), an implement for construction equipment such as hydraulic excavators includes a boom 51, an arm 52 and a bucket 53 as chief components. Many coupling devices for these components are used in parts such as rotating sections where the components are linked; hydraulic cylinder sections where they are operated; and coupling sections where they are coupled to the vehicle body. FIG. 19(b) (exploded perspective view) shows the structure of a bucket coupling section in details. Implement bushings 54, 55 provided for the coupling section have, in their respective inner circumferential surfaces, a grease lubricating groove and a thermally hardened layer which has a hardness of HRC 45 or more and is formed by carburization quenching or induction hardening in order to attain improved seizure resistance and wear resistance. Also, implement pins 56, 57, 58 have, in their respective outer circumferential surfaces, a thermally hardened layer which has a hardness of HRC 45 or more and is formed by induction hardening or carburization quenching in order to achieve improved seizure resistance, wear resistance and breakage resistance. Further, in the coupling sections where the implement bushings 54, 55 are coupled to the implement pins 56, 57, 58, there is formed a nipple for injecting lubricating grease. This nipple allows the grease to be supplied from outside to the contact surfaces through a grease hole defined in the implement bushing and through the grease groove in the inner circumference of the implement. Sealing devices 59, 60 are also provided to prevent an escape of the lubricating grease present between the implement bushing and the implement pin and penetration of earth, sand and muddy water, whereby occurrence of seizure between the inner circumferential surface of the implement bushing and the outer circumferential surface of the implement pin is prevented and, in consequence, improved wear life is ensured.

The grease supply mechanism similar to one described above is applied to implement coupling devices for other construction equipment than the hydraulic shovel shown in FIG. 19(a). Such implement coupling devices are provided at high positions. In many cases, with the intention of overcoming inconveniences for operation, a lubricating grease feeding pipe is used for feeding grease from a convenient position.

If the lubricating grease runs out, seizure, abnormal noise (squeak), abnormal wear and the like will occur at the coupling sections, and therefore, grease feeding needs to be done at intervals of 24 to 50 hours in the actual circumstances. The grease feeding has, however, failed in completely preventing occurrence of seizure, abnormal noise (squeak), abnormal wear etc. at the coupling sections.

If seizure, abnormal noise (squeak), abnormal wear or the like occurs at the coupling section where an implement bushing and an implement pin are coupled, there arises a need for replacement of not only the implement bushing and but also the implement pin, which disadvantageously involves troublesome replacement work and increased cost.

For easy maintenance of implements, various metal based sintered contact materials having good seizure resistance and good oil retention performance have been recently applied to implement bushings. The effect of use of such materials in terms of characteristics is not much more than prolongment of the greasing intervals to about 250 to 500 hours of time. It is still the case that the grease feeding pipes and similar parts have not been disused yet and no satisfactory measure has been developed for cost reduction.

In view of the improvements in the operating efficiency of construction equipment and the environment of the job sites, there exist an imperative need for reduction of the total weight of an implement and improved absorbability for noise occurring at the coupling sections. In addition, weight saving of the coupling sections themselves is a task to be tackled.

The invention has been directed to overcoming the foregoing problems and a primary object of the invention is therefore to provide a coupling device for equipment implements, which coupling device does not impair the lubricity of bearing sections when the equipment is in service, does not cause seizure during rotation of bearings, does not need frequent feeding of grease to the bearing section from outside, and provides good noise absorbability.

DISCLOSURE OF THE INVENTION

The above object can be accomplished by an implement coupling device according to a first aspect of the invention, which is composed of an implement bushing made from steel and an implement pin which are for use in an implement for construction equipment, wherein a metal based contact material having a structure capable of storing a lubricating oil and/or lubricant is interposed in a gap defined by the implement bushing and the implement pin.

According to the invention, since a metal based contact material having a structure capable of storing a lubricating oil and/or lubricant is interposed in a gap defined by the implement bushing and the implement pin, an implement coupling device can be provided which does not impair the lubricity of a bearing section when the construction equipment is in service; prevents occurrence of seizure during rotation of a bearing; and does not need frequent grease feeding from outside but provides good noise absorbability.

Since loads at a level three times the weight (W) of the vehicle body are frequently imposed on the implement coupling sections of the construction equipment (this loaded condition includes shocks), the implement bushing often comes into sliding contact with the implement pin at a surface pressure of more than 600 kgf/cm$^2$, and in addition, its sliding speed is extremely slow (2 m/min or less). Therefore, lubricity is difficult to be maintained. Sliding speed is very slow (0.2 m/min or less), particularly in a coupling section 63 (see FIG. 19(a)) where a boom cylinder 61, an arm cylinder 62 and a boom are coupled to the vehicle body, so that frequent occurrence of seizure and abnormal noise is unavoidable even if grease is frequently supplied.

In the invention, a quench-hardened steel having a hardness of HRC 45 or more and a softer-metal based contact material are used in combination for the contact surfaces of the implement bushing and the implement pin, in order that either the implement bushing or the implement pin gets damaged in precedence to the other because of the different materials provided for their contact surfaces so that only either one of them may be replaced.

In the invention, it is preferable to hole the metal based contact material and fill the hole with a lubricating oil and/or a lubricant. Preferably, the above metal based contact material is a metal based porous sintered contact material having 5 to 30% by volume pores and its mating contact material is a quench-hardened steel having a hardness of HRC 45 or more.

It is important for the metal based porous sintered contact material used for the implement bushing to have an oil retaining structure or a structure capable of evenly feeding a lubricant (e.g., grease) to the sliding contact surface. In the invention, the lubricity of the contact surface has been improved by making the contact material contain a lubricating oil in its pores. The porosity of the metal based porous sintered contact material is determined to be within the range of from 5% by volume to 30% by volume, because 5% by volume or more pores are necessary for smooth movement of the lubricating oil within the sintered compact and the upper limit should be 30% by volume in view of the strength of the metal based sintered compact.

Further, a plurality of holes of various shapes are made in the metal based sintered contact material and filled with a large amount of grease or lubricating oil such that the grease and lubricating oil can be stably supplied to the contact surface for a long period of time. The maximum area percentage of the holes in the contact surface is properly determined according to the seizure resistance of the metal based sintered contact material. In view of the fact that the Cu—Al—Sn, Cu—Al—Ti copper based sintered contact materials (described later) taught by the invention have seizure resistance two to four times as high as those of the conventional contact materials, it is apparent that the area percentage of the working holes may range from about 0 to 75% by area.

Preferably, the metal based contact material is made to be integral with either the implement bushing or the implement pin when the implement coupling device is assembled. Further, taking account of the replacement workability of the coupling device, in other words, the fact that the implement bushing is pressed in the main body when it is used and pulled out of the main body with a jig when it is replaced, whereas the implement pin can be easily pulled out, the invention proposes a configuration in which the metal based contact material is inserted into the gap between a conventional implement bushing made from steel and an implement pin. Alternatively, taking account of the trouble of inserting the metal based contact material, the invention proposes an implement pin having the metal based contact material integral with the outer circumference thereof.

Specifically, it is preferable that the above-described metal based porous sintered contact material be integral with an inner circumferential sliding contact portion of the implement bushing which is in sliding contact with the implement pin which is made from steel and in which at least its outer circumferential surface is thermally hardened to a hardness of HRC 45 or more.

Alternatively, it is preferable that the above-described metal based porous sintered contact material be integral with an outer circumferential sliding contact portion of the implement pin which is in sliding contact with the implement bushing which is made from steel and in which at least its inner circumferential surface is thermally hardened to a hardness of HRC 45 or more.

As an integration method for the substantially cylindrical metal based contact material which is formed from a cylindrical material or formed by roundly bending a sheet-like material into a cylindrical shape, there may be used sinter-bonding, press fitting, fitting, bonding, brazing, binding with a band, clinching and others. In consideration of replacement workability at the job sites, binding with a band or clinching is suitably employed, because they are light fitting methods.

In such integration methods utilizing a light force, when the implement coupling device rotates, an extrusive force is exerted in an axial direction of the implement pin so as to push the metal based contact material out. It is, therefore, desirable to form a groove in the outer circumference of the implement pin and to attach part or all of the metal based contact material to the area along the configuration of the groove so that drag is caused against the extrusive force.

As the metal based contact material, a copper based contact material, which is softer than quench-hardened steel having a hardness of HRC 45 or more and exerts good chemical adhesion with respect to steel, is preferably used. A metal based porous sintered contact material having 5 to 30% by volume pores is used as the metal based contact material and the pores of the metal based porous sintered contact material are filled with a lubricating oil so that occurrence of seizure can be restrained as much as possible in severer environments. It is obviously desirable to use Cu—Al—Sn and Cu—Al—Ti based sintered contact materials containing at least a β hard phase (described later) in much severer environments.

Where the metal based porous sintered contact material is used, it is obviously preferable to employ an integration method in which a cylindrical or substantially cylindrical compact or a cylindrical or substantially cylindrical pre-sintered compact is sinter-bonded to the outer circumference of the implement pin.

Another preferred integration method is such that, in order to eliminate the trouble of re-incorporation of the implement pin after being pulling out, two cylindrical rings are provided such that each ring is disposed at an end face of the implement bushing with a sealing device or a sealing device and a thrust ring between, and while the cylindrical rings and the implement pin inserted in the bores of the rings being secured, the implement bushing and the implement pin are made to be integral with each other (in a manner similar to when a cassette is inserted). With this arrangement, a grease-feeding maintenance free coupling device can be attained.

The implement bushing and/or implement pin have a rotatable structure so that the load surface of the metal based contact material can be timely changed after long use in order to improve the service life of the coupling device. More concretely, the implement bushing part may be rotated after loosening or removing securing pins, with the coupling device being set in the main body. Another alternative is such that the implement pin part is rotated by rotating the fixed positions of a coupling bolt.

In each aspect of the invention, the implement pin is preferably processed into a cylindrical shape so as to store a lubricating oil and its inner circumference is hardened by heat treatment to HRC 35 or more.

For easy maintenance of the implement, the implement pin is preferably designed such that a lubricating oil feeding hole made in a radial direction of the implement pin does not completely pass through the metal based porous sintered contact material to the other side thereof so that the lubricating oil stored in the bore is fed to the contact surface through the pores of the metal based porous sintered contact material. In this way, a large amount of lubricant is stored at the contact surface, with the result that the need for grease feeding pipes and the like can be obviated and an economical improvement can be expected.

The commonly used grease may be utilized as the lubricant, but it has extremely high viscosity so that it needs to be delivered by hand or by pressurizing it with a machine when it is supplied to the contact surface. Therefore, use of the grease may obviate the need for grease feeding pipes but still remains unsatisfactory in terms of easy maintenance. For this reason, the invention uses a liquid type lubricating oil which exhibits low viscosity at least at room temperature, thereby eliminating the need for oil feeding by pressurization. More specifically, the implement pin of the invention satisfies at least one of the following conditions.

(1) As the metal based contact material integral with the outer circumferential surface of the implement pin, a metal based porous sintered contact material having 5 to 30% by volume pores is used. By utilizing the lubricating oil retention ability of the pores of the metal based porous sintered contact material, a large amount of lubricating oil is prevented from flowing out of the contact surface.

(2) The lubricating oil feeding hole provided for the implement pin is designed not to completely pass through the metal based porous sintered contact material to the other side thereof.

(3) The metal based contact material is properly holed by machining and the hole is filled with a porous material having high oil retention ability (e.g., graphite, urethane foam, oil impregnated plastics and felt), thereby increasing oil retention ability at the contact surface.

(4) The lubricating oil storing hole and lubricating oil feeding hole of the implement pin are filled with the aforesaid porous material such as urethane foam as well as a lubricating oil, thereby controlling a supply of the lubricating oil to the contact surface.

(5) An oil sealing device such as lip seals is disposed in an inner circumferential surface portion at each end of the implement bushing such that the lubricating oil is properly blocked at the outer circumferential surface of the implement pin so as not to flow out of the coupling device.

The larger the diameter of the lubricating oil storing hole is, the more the lubricating oil can be stored, but the risk of damage to the implement pin caused by the aforesaid great load should be avoided. This problem is solved in the following way in the invention. The bending stress imposed on the implement pin when the main body of the construction equipment is operated in the severest working condition is measured, and based on the result (25 kgf/cm$^2$ or less) and the section modulus Z of a bent of a solid implement pin, the section modulus of a bent of the cylindrical implement pin of the invention is adjusted so as not to be below 0.6 (42 kgf/mm$^2$ or less; It should be noted when taking account of a safety factor which is 1.5 times the stress concentration due to blemishes on the surface, the section modulus Z should not be below 65 kgf/mm$^2$). It has been found that if a shock is imposed on the cylindrical implement pin, cracking occurs from the inner circumferential surface due to a tensile stress caused by radial squeezing, and the crack expands in an axial direction and reaches the outer circumferential surface. In order to reinforce the inner circumferential surface by thermal treatment so as to at least withstand this tensile stress, the hardness of the inner circumferential surface is increased to HRC 30 or more so that a fatigue strength of 50 kgf/mm$^2$ or more is ensured. It is apparent that the hardness of the inner circumferential surface is preferably HRC 35 (more preferably, HRC 45) or more.

Where the section modulus Z of the cylindrical implement pin is 0.6, the ratio between the thickness and outside diameter of the cylindrical implement pin is about 10% and the weight of the implement pin is considerably reduced by about 64%. It is understood from this that the above section modulus highly contributes to an improvement in the operational efficiency of the implement. Similarly, where the thickness to outside diameter ratio is about 25%, the section modulus Z is about 0.93 and a weight reduction of about 25% can be accomplished so that the thickness to outside diameter ratio is preferably adjusted to the range of from 0.10 to 0.25. Specifically, a quench-hardened layer having a hardness of HRC 45 is formed in the outer circumference and inner circumference of the implement pin and a softened layer is formed between the outer circumferential hardened layer and the inner circumferential hardened layer. The thickness of the softened layer is 0.1 to 0.25 times its outside diameter. It is preferable that the implement be more lightweight than a solid implement pin having the same outside diameter and length by 25 to 65%.

Further, in the invention, the large lubricating oil storing hole is filled with an urethane foam resin having good noise absorbability and the pores of the urethane foam are filled with a lubricating oil, in order that the noise absorbability of the implement pin is dramatically increased. Concretely, it is preferable in the invention that a resin having good noise absorbability such as urethane foam be disposed in the bore of the implement pin, and/or the implement pin be provided with a lubricating oil feeding hole extending in a radial direction such that the lubricating oil stored in the bore can be fed to the contact surface, and/or the resin and the lubricating oil coexist.

For storing the lubricating oil in the bore of the cylindrical implement pin, there is a need for devices for sealing the bore at both end faces such that the lubricating oil does not flow out. Either one or both of the sealing devices do not project from the end face(s) of the implement pin for fear that the implement pin might interfere with the pressing jig when it is attached or detached and that the implement pin might get damaged during hammering. Furthermore, either one of the sealing devices is designed to feed the lubricating oil therefrom. In short, the invention is preferably designed such that both end faces of the implement pin containing a lubricating oil in its bore are sealed by sealing devices either or both of which do not project from the end faces of the implement pin, and such that the lubricant oil can be fed from either one of the sealing devices.

The implement pin is preferably designed such that the lubricating oil feeding hole made in a radial direction does not completely pass through the metal based porous sintered contact material to the other side and the lubricating oil stored in its bore can be fed to the contact surface through the pores in the metal based porous sintered contact material. Moreover, it is desirable for each aspect of the invention that the metal based porous sintered contact material be holed and the hole be filled with a lubricant as well as a material having good noise absorbability and oil retention ability such as resin, rubber, felt and graphite.

According to the invention, instead of the provision of the metal based porous sintered contact material which has uniform pores dispersed therein and is integral with the outer circumference of the implement pin, the whole implement bushing may be formed from a metal based porous contact material or alternatively, a metal based contact material may be integrally attached to the inner circumferential surface of a cylindrical or substantially cylindrical backing made from steel. In this case, it is desirable that the metal based porous sintered contact material integral with the implement pin or the implement bushing be an Fe—Cu—Al based porous sintered contact material containing at least 2 to 30 wt % Al and 15 to 40 wt % Cu.

It is apparently preferable for the invention that the metal based contact material consisting of a metal based porous sintered contact material having good sliding properties be provided with a plurality of holes of various shapes and a large amount of grease and lubricating oil is stored in these holes and that these holes are also filled with resin or the like having good sliding properties, noise absorbability and oil retention ability. More concretely, where the whole implement bushing is formed from a metal based porous sintered contact material, a drilling and cutting process by machining becomes necessary, and in this case, a contact material which consists of a thin, cylindrical metal based porous sintered contact material and has holes of various shapes may be utilized, or alternatively, a sheet-like metal based porous sintered contact material having holes of various shapes therein is bent into a round shape. Taking cost into account, a sheet-like contact material holed by press work and bent into a round shape is more preferably utilized.

Where the whole implement bushing is formed from the metal based porous sintered contact material, a lubricating oil of low viscosity to be supplied tends to flow out and, therefore, a condition in which no grease exists might continue for a long time. To avoid such a risk, the lubricating oil used for the first oil impregnation treatment for the implement bushing of the invention is preferably prepared by blending, in good time, a lubricating oil of low viscosity and a material capable of increasing viscosity (e.g., wax and grease) thereby to achieve at least an increased liquefaction temperature of 50° C. or more for carrying out the heating and oil impregnation treatment. Furthermore, the inner circumferential surface portion of the implement bushing at each end is preferably provided with an oil sealing device.

As the implement bushing impregnated with the lubricating oil and/or grease, an inexpensive bushing integrally formed from a high-strength, hard iron based porous sintered material is suitably used. An example of such an inexpensive bearing is an Fe—C—Cu based oil retaining sintered bearing which has been subjected to thermal treatment such as carburization quenching and the porosity of this bearing may be adjusted to the range of from 5 to 30% by volume. Preferably, in the invention, the whole implement bushing is constituted by an Fe—Cu based porous sintered contact material and has undergone thermal treatment such as quenching and carburization quenching so as to have a hardness of HRC 45 or more.

As described earlier, under a sliding condition in which surface pressure is more than 600 kg/cm$^2$ and sliding speed is 2 mm/min or less at a coupling section of construction equipment, lubrication is extremely difficult and therefore the iron based oil retaining bearings often work unsatisfactorily. The invention preferably uses materials containing an Fe—Al based ordered phase, which have been proposed by the present inventors in U.S. patent application Ser. No. 10/011,815, under such an extremely severe condition, because the materials containing an Fe—Al based ordered phase are not seized at a high surface pressure more than three times the surface pressure which an Fe—C—Cu based oil retaining sintered bearing (described later) can withstand. In short, the whole implement bushing is constituted by an Fe—Cu—Al based porous sintered contact material and contains at least 2 to 30 wt % Al and 15 to 40 wt % Cu.

When used under a sliding condition with higher load and lower sliding speed, copper based porous contact materials are preferable, in which their Young's moduli are about one half of that of steel, in which the area of the copper based materials in contact with the implement pin increases with reduced surface pressure, and in which the copper based materials are chemically unlikely to seize up with respect to steel. Although copper based porous contact materials are generally known to be soft and poor in wear resistance, the Cu—Al—Sn and Cu—Al—Ti copper based porous sintered contact materials which contain a hard β phase in their structures and have been previously proposed by the present inventors in U.S. Pat. No. 6,613,121 are suited for use as a contact material whose mating material is steel. Therefore, the implement bushing and implement pin of the invention preferably utilize these porous sintered contact materials.

Specifically, it is preferable that the metal based porous sintered contact material used for integration with the implement bushing or the implement pin be a copper based sintered contact material having a Young's modulus lower than that of steel, excellent seizure resistance, wear resistance and corrosion resistance. Herein, the copper based sintered contact material may be a Cu—Al based porous sintered contact material having a sinter structure in which at least a hard β phase exists or an α phase and β phase coexist, and the hardness of the sinter structure may be Hv 130 or more. Preferably, the copper based sintered contact material is a Cu—Al—Ti based sintered contact material produced by compacting and sintering a powder (blended for producing a copper based sintered material) which contains 5 to 12 wt % Al as an essential element and 0.3 to 5 wt % Ti to form a sintered compact; and then repeatedly performing a re-compacting and sintering process on the sintered compact once or more. The copper based sintered contact material may be a Cu—Al—Sn based sintered contact material which contains 5 to 12 wt % Al, 3 to 6 wt % Sn, and 0.5 to 5.0 wt % one or more elements selected from the group consisting of Ti, Ni, Co, Si, Fe, P and graphite.

Where the above copper based porous sintered contact material is used for the whole implement bushing, it costs considerably high. It is economically advantageous that a thin, metal based porous sintered contact material is made to be integral with the inner circumferential surface of a cylindrical or substantially cylindrical backing made from an inexpensive high strength steel. Although the integration may be carried out by sinter bonding, it is more preferable in view of cost to press a cylindrical or substantially cylindrical metal based porous sintered contact material into the bore of the backing or bond it to the inner circumferential surface of the backing. In this case, the substantially cylindrical metal based porous sintered contact material is formed by roundly bending of a sheet-like material, welding, clinching or similar method.

A thrust force works axially between the implement pin and the implement bushing during operation and also, a slipping-off force conceivably could work axially on the metal based porous sintered contact material. In view of this, it is preferable that the metal based porous sintered contact material be pressed in the bore of the implement bushing or bonded to the inner circumferential surface of the implement bushing. More preferably, the inner circumference of the backing for the implement bushing is grooved and the metal based porous sintered contact material is processed so as to have a configuration which fits the shape of the groove, whereby slipping off due to the thrust force is prevented by the groove or the thrust force is received by the side face of the press fit section where the implement pin is pressed in.

In addition, the invention preferably has such a structure that the implement bushing in which the metal based contact material is pressed or fitted has a sealing device at an inner circumferential surface portion in the vicinity of each end thereof and each sealing device seals off the gap between the inner circumferential surface of the implement bushing and the outer circumferential surface of the implement pin, so that the grease and lubricating oil can be retained for a long period of time and at the same time, penetration of earth, sand and muddy water from outside can be prevented thereby improving the seizure and wear life of the implement coupling device.

BEST MODE FOR CARRYING OUT THE INVENTION

Figure 1:
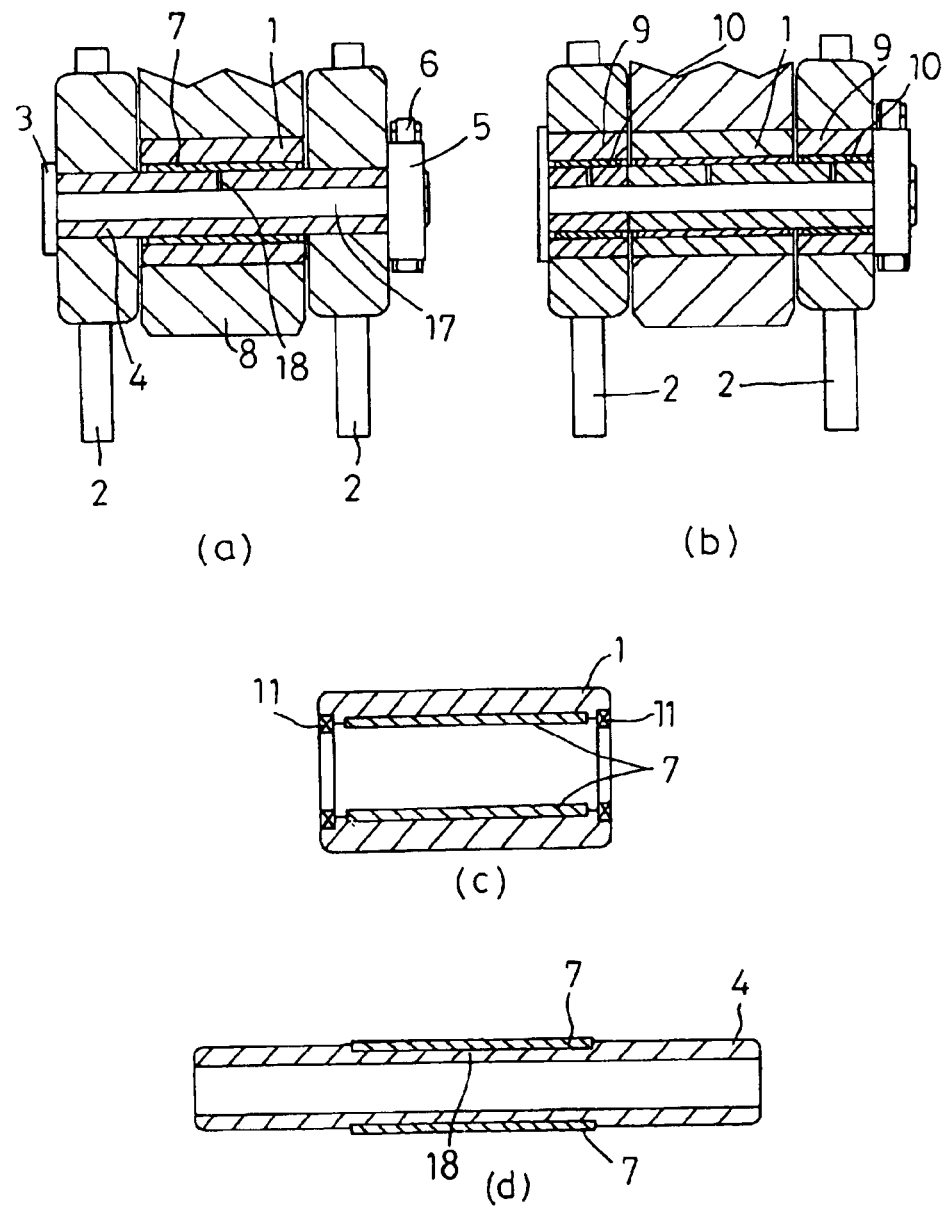
FIGS. 1(a), 1(b), 1(c), and 1(d) are sectional views (I) of a coupling device for implements according to one embodiment of the invention.

Referring now to the accompanying drawings, a coupling device for implements will be described according to preferred embodiment of the invention.

FIGS. 1(a), 1(b), 1(c), and 1(d) show sectional views of an implement coupling device according to one embodiment of the invention.

As the typical implement coupling device of the present embodiment, a coupling device for connecting a bucket to an arm body of a hydraulic excavator is shown in FIG. 1(a). This coupling device comprises an implement bushing 1 to be forced into an arm body 8 and a cylindrical implement pin 4 which passes through the bore of the implement bushing 1 and through holes defined in bucket frames 2. A steel plate 3 is integrally attached to one end of the implement pin 4, for preventing slipping off of the implement pin 4. Further, the implement pin 4 is secured to the bucket frames 2 by a securing ring 5 and a securing bolt 6 so that when a bucket is operated, the implement pin 4 rotates together with the bucket, being in sliding contact with the implement bushing 1. Interposed between the implement bushing 1 and the implement pin 4 is a metal based contact material 7 having a structure capable of oil impregnation and/or storing a lubricant such as grease. During operation, seizure, abnormal noise and like are allowed to be concentrated in the metal based contact material 7, thereby lessening the frequency of repairing.

To prevent abnormal noise (squeaking) which occurs between the bucket frames 2 and the implement pin 4 because of a slight sliding movement attributable to the slight deflection of the implement pin 4 fixed to the bucket frames 2, it is preferable to dispose an implement bushing 9 and a metal based contact material 10 in each bucket frame 2 as shown in FIG. 1(b).

Further, in order to ensure improved seizure resistance and prevent abnormal wear due to local seizure, a metal based porous sintered contact material having 5 to 30% by volume of pores and a quench-hardened steel having a hardness of HRC 45 or more are used in combination as the materials of the contact surfaces of the implement bushing 1 and the implement pin 4, and the pores of the metal based porous sintered contact material are filled with a lubricant. FIG. 1(c) shows an example in which the inner circumference of the implement bushing 1 is grooved and the metal based contact material 7 is integral with the groove, whereas FIG. 1(d) shows an example in which the outer circumference of the implement pin 4 is grooved and the metal based contact material 7 is integral with the groove. In FIG. 1(c), reference numeral 11 indicates a sealing device.

Figure 2:
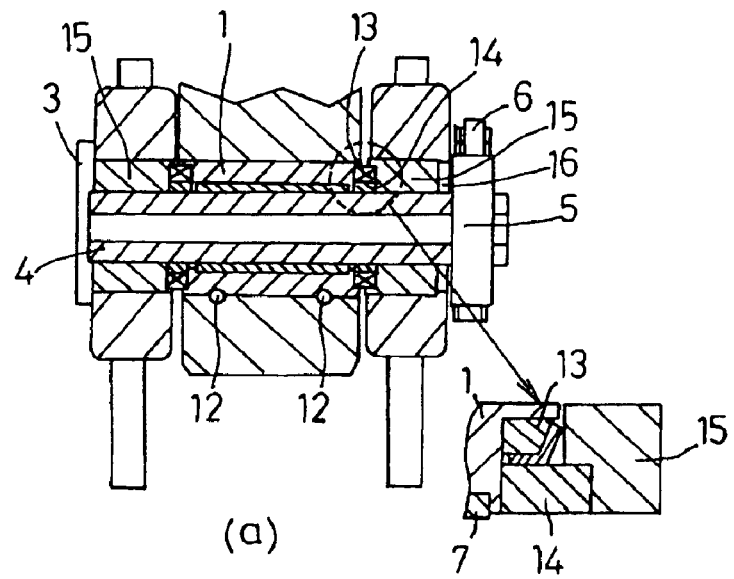
FIGS. 2(a) and 2(b) are sectional views (II) of a coupling device for implements according to another embodiment of the invention.
Figure 2:
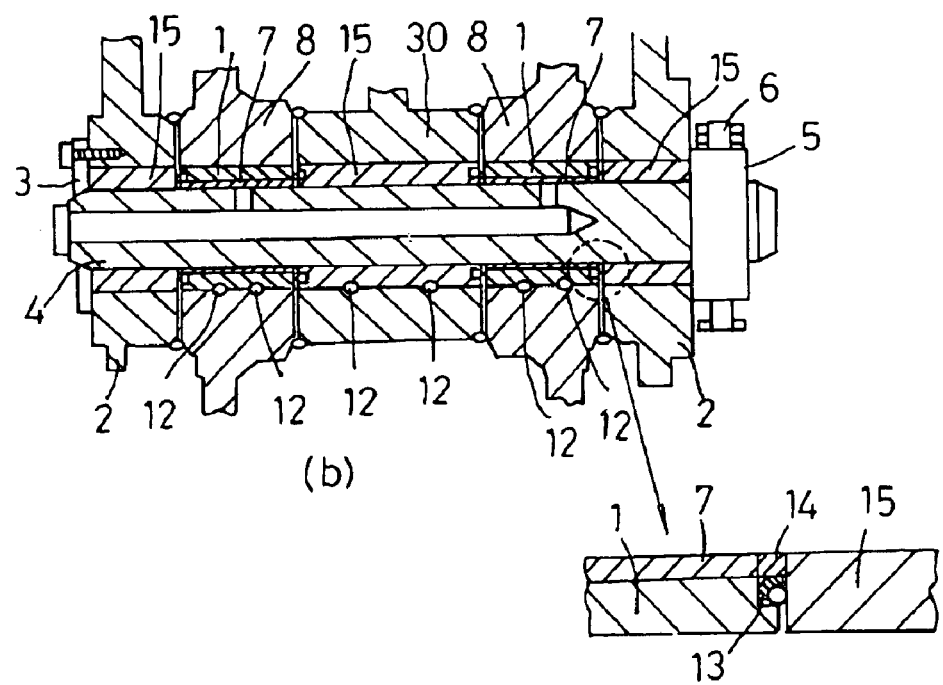

As shown in FIG. 2(a), the implement pin 4 and the implement bushing 1 are made to be integral with each other through a sealing device 13 or through the sealing device 13 and a thrust ring 14 by means of securing rings 15, 16, thereby simplifying attachment and detachment of the coupling device to and from the main body. Further, in order to allow changing of the load surface of the metal based contact material 7 after long use, the coupling device may be designed such that the implement bushing 1 can be rotated by loosening or removing bushing securing pins 12 while the integral coupling device being mounted on the main body and/or designed such that the implement pin 4 can be rotated by loosening or removing the securing pin 5 and the securing bolt 6.

When coupling the arm body 8 having a two-forked bracket section to the bucket frames 2 as shown in FIG. 2(b), an implement bushing 1 may be mounted on each branch of the two-forked bracket section through the sealing device 13 or through the sealing device 13 and the thrust ring 14 and attached integrally with the bracket section through a ring 30 by means of the implement pin 4 and the securing rings 15, 16. With this arrangement, the bracket section as well as the implement bushing 1 can be made to be compact so that the attachment and detachment can be facilitated. Further, in order to make the load surface of the metal based contact material 7 changeable after long use, there may be employed such a structure that the implement bushing 1 can be rotated by loosening or removing the bushing securing pins 12 while the integral coupling device being mounted on the main body and/or a structure in which the implement pin 4 can be rotated by loosening or removing the securing pin 5 and the securing bolt 6.

For ensuring a supply of oil to the metal based porous sintered contact material (the metal based contact material 7) for a long time, the implement pin 4 is provided, in its center, with a lubricating oil storing hole 17 which extends in an axial direction of the implement pin 4 and with a lubricating oil feeding hole 18 which extends in a radial direction of the same, so that the lubricating oil stored in the implement pin can be supplied to the contact surface. In addition, with the intention of obviating the need for manual or mechanical pressure-feeding to the contact surface such as when grease is fed, the present embodiment uses a low-viscosity lubricating oil which takes the form of liquid at least at room temperature and the implement pin 4 meets at least one of the following requirements (1) to (5) (see FIG. 3).

(1) As the metal based contact material 7 integral with the outer circumferential surface of the implement pin 4, a metal based porous sintered contact material having 5 to 30% by volume pores is used. By utilizing the lubricating oil retention ability of the pores of the metal based porous sintered contact material, a large amount of lubricating oil is prevented from flowing out of the contact surface.

(2) The lubricating oil feeding hole 18 provided for the implement pin 4 is designed not to completely pass through the metal based porous sintered contact material to the other side thereof.

Figure 3:
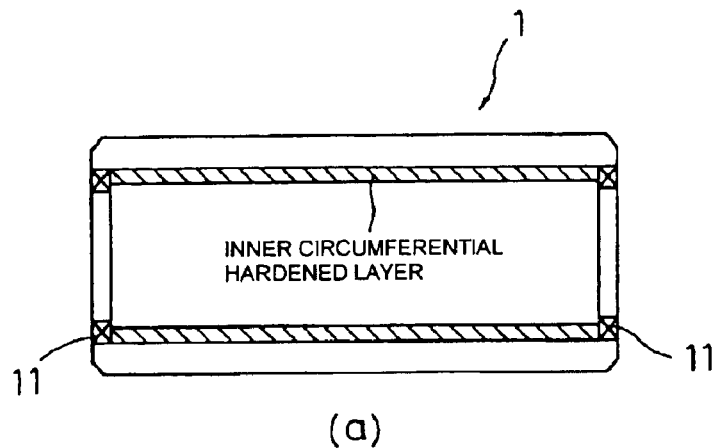
FIGS. 3(a), 3(b) and 3(c) show a method of self-greasing by an implement pin.
Figure 3:
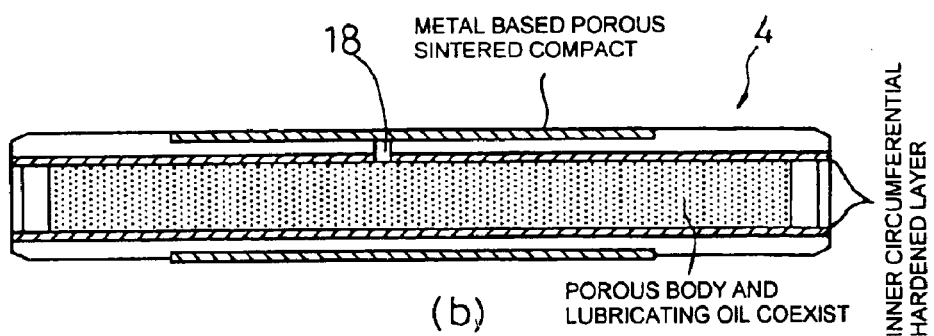
Figure 3:
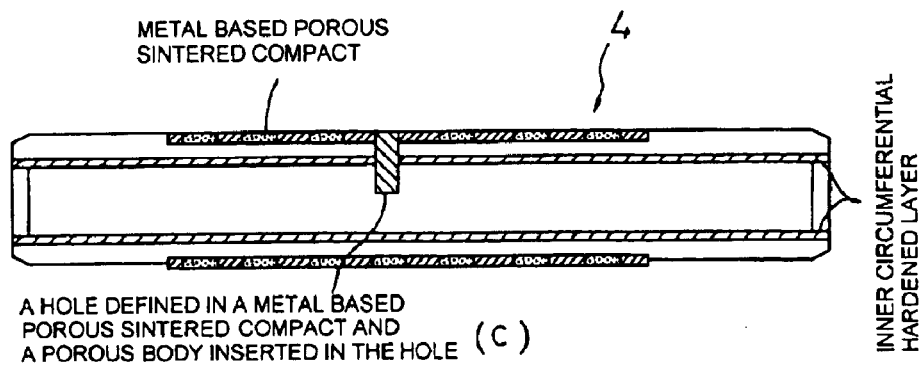

(3) The metal based contact material 7 is properly holed by machining and the hole is filled with a porous material having high oil retention ability (e.g., graphite, urethane foam, oil impregnated plastics and felt), thereby increasing oil retention ability at the contact surface (see FIG. 3(*c*)).

(4) The lubricating oil storing hole 17 and lubricating oil feeding hole 18 of the implement pin 4 are filled with a porous material such as urethane foam, felt and graphite as well as a lubricating oil, thereby controlling a supply of the lubricating oil to the contact surface (see FIG. 3(*b*)).

(5) An oil sealing device 11 such as lip seals is disposed in an inner circumferential surface portion at each end of the implement bushing 1 (see FIG. 3(*a*)) such that the lubricating oil is properly blocked at the outer peripheral surface of the implement pin 4 so as not to flow out of the coupling device.

In the present embodiment, at least the inner circumferential surface of the implement pin 4 is reinforced by thermal treatment, so that the implement pin 4 can be formed into a thin cylindrical shape as described later. With this arrangement, a large amount of lubricant can be stored in the bore of the implement pin 4 to obviate the need for grease feeding from outside the coupling device, which results in disuse of grease feeding pipes and saving of labor required for the grease feeding.

The larger the inside diameter of the cylindrical implement pin 4, the more the lubricating oil etc. can be stored (described later). However, the inside diameter should fall in a proper range to avoid the risk of damage to the implement pin 4 caused by a great load. In the embodiment, the bending stress imposed on a (cylindrical) solid implement pin when its associated construction equipment ("PC300" produced by KOMATSU LTD.) is operated in the severest working condition is measured at the bucket cylinder bottom coupling section which is subjected to an extremely high impact load, and based on the measurement result (23 kgf/cm$^2$ or less) shown in FIG. 4 and the modulus of bent section Z of the solid implement pin, the section modulus Z of the cylindrical implement pin 4 of the present embodiment is adjusted not so as to be below 0.6 (40 kgf/mm$^2$ or less).

It has been found that where an impact load is imposed on the cylindrical implement pin, cracking occurs from the inner circumferential surface due to a tensile stress caused by radial squeezing and the crack expands in an axial direction and reaches the outer circumferential surface. In order to reinforce the inner circumferential surface by thermal treatment so as to at least withstand this tensile stress, the hardness of the inner circumferential surface is increased to HRC 30 or more so that 50 kgf/mm$^2$ or more is ensured in terms of fatigue strength. More preferably, the hardness of the inner circumferential surface is HRC 35 or more, taking account of a safety factor of about 1.5 due to blemishes etc. on the surface.

Figure 5:
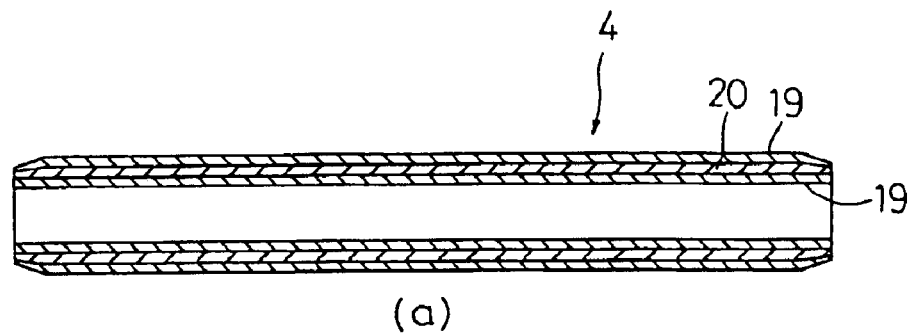
FIGS. 5(a) and 5(b) each show a thermally hardening pattern for a lightweight implement pin and FIG. 5(c) shows a hardness distribution map.
Figure 5:
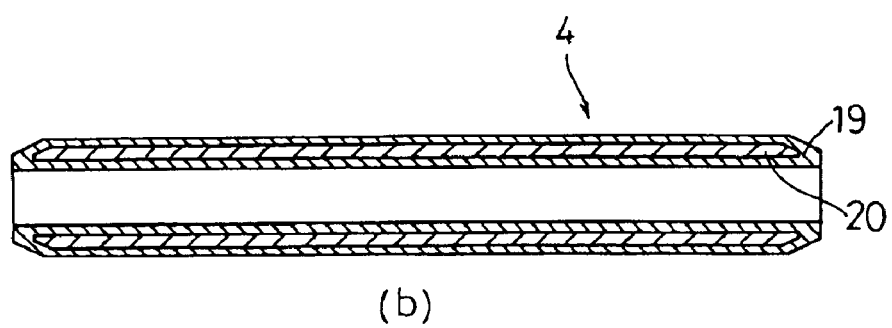
Figure 5:
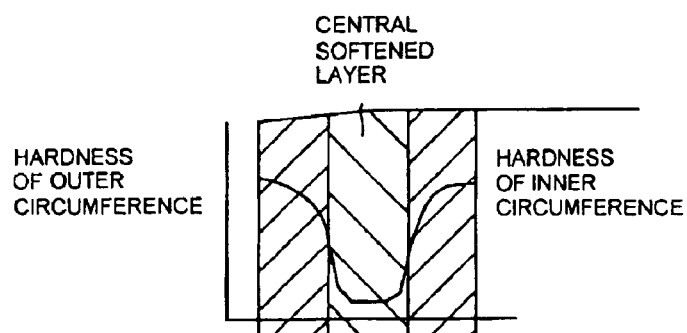

As the thickness of the cylindrical implement pin decreases, breakage due to a tensile stress caused by radial squeezing becomes more serious and therefore the reinforcement of the inner circumferential surface becomes more important. Although the cylindrical implement pin may be hardened to HRC 40 or more across the thickness of the implement pin, the present embodiment provides a high-strength implement pin designed such that as shown in FIG. 5, a hardened layer 19 is formed in both outer circumferential surface and inner circumferential surface of the cylindrical implement pin 4 and a softened layer (soft layer) 20 is formed between the inner and outer circumferential surfaces, thereby generating a compressed residual stress on the inner and outer circumferential surfaces.

Figure 6:
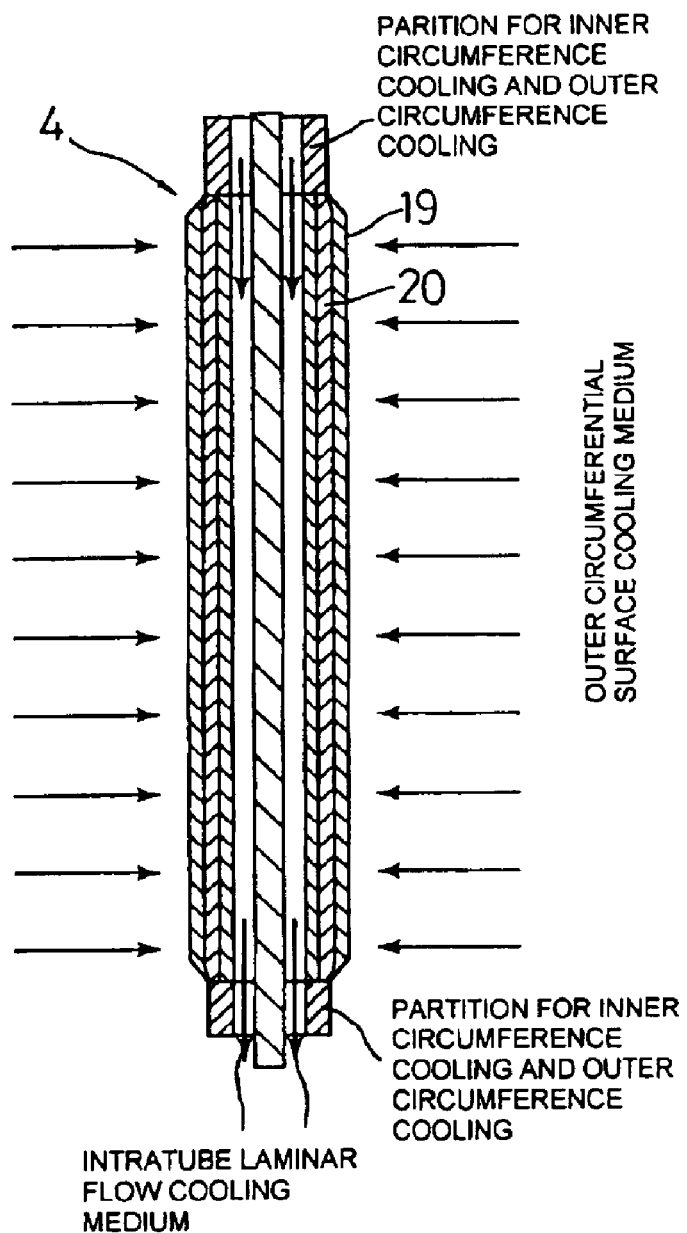
FIG. 6 is an explanatory diagram of a method for cooling the inner circumference of a cylindrical implement pin.

Commonly used implement pins have outside diameters of 30 to 150 mm and the cylindrical implement pin of the present embodiment has a thickness as great as 37.5 mm. Therefore, where inexpensive carbon steel or boron steel is used, it is more preferable to directly quench the inner circumferential surface, but uniform quench-hardening of the inner circumferential surface is extremely difficult because implement pins are long cylindrical bodies having very small diameters. To overcome this problem, the present embodiment proposes that after entirely heating a cylindrical implement pin to a temperature region in which the pin material is quenchable, at least the inner circumferential surface of the implement pin is quenched by intratube laminar flow cooling in which partition plates for dividing the outer circumferential surface and the inner circumferential surface from each other are used as shown in FIG. 6, thereby forming the hardened layers 19 on the outer and inner circumferential surfaces and the softened layer 20 between the outer and inner circumferential surfaces as shown in FIG. 5. In this way, the present embodiment produces a high-strength implement pin in which a compressed residual stress is generated on the inner and outer circumferential surfaces.

Generally, a decarburized layer of 1 mm or less is formed on the inner circumferential surface of a cylindrical implement pin material having a thickness to outside diameter ratio of 10 to 25%, whereas the present embodiment disuses machining of the inner circumference portion because a thermal treatment is applied to the inner circumference portion and high strength is not required in some coupling sections.

Where the section modulus Z is 0.6, the thickness to outside diameter ratio of the cylindrical implement pin is about 10% and a considerable weight reduction of about 64% can be achieved which highly contributes to an improvement in the operational efficiency of the implement. Similarly, where the thickness to outside diameter ratio is about 25%, Z is about 0.93 and a weight reduction of about 25% is attained. In consideration of this, the thickness to outside diameter ratio is preferably adjusted to the range of from 0.10 to 0.25 (the section modulus is 0.6 to 0.93).

In the present invention, the noise absorbability of the implement pin and its function to obviate grease feeding from outside the coupling device have been further enhanced by filling the large lubricating oil storing hole with urethane foam or the like having good noise absorbability, as shown in FIG. 3.

Where the lubricating oil is stored in the bore of the cylindrical implement pin, it is necessary to use a device (the sealing device 11) for sealing the inner circumferential surface portion of each end to prevent a flow-out of the lubricating oil as shown in FIG. 3. Either or both of the sealing devices do not project from the end faces of the implement pin so that interference with a press-in jig at the time of attachment or detachment of the implement pin and breakage during hammering can be prevented. Further, either of the sealing devices is arranged to supply the lubricating oil.

Where the whole implement bushing is formed from a metal based porous sintered compact and its sliding contact part is hardened to HRC 45 or more, this bushing is preferably used in combination with the above-described implement pin. If the low viscosity lubricating oil replenished from the bore of the implement pin is likely to flow out of the coupling device, leading to happening of a condition where no grease is supplied for a long time, one of the above-described measures (1) to (5) may be taken. In the invention, the lubricating oil used for carrying out the first oil impregnation of the implement bushing is prepared by blending, at a proper time, a low-viscosity lubricating oil and a material for increasing viscosity such as wax and grease, such that at least the liquefaction temperature of the oil is increased to 50° C. or more for heating and oil impregnation treatment. Further, it is preferable to provide the inner circumferential surface portion of each end of the implement bushing with an oil sealing device.

As the implement bushing entirely formed from a sintered material, a bushing with which a high-strength, high-hardness iron based porous sintered material is integrally formed is suitably used. For instance, use of an Fe—C—Cu based oil retaining sintered bearing which has undergone a thermal treatment such as carburization quenching is more economical. In this case, it is important to adjust the porosity of the bearing to a range of from 5 to 30% by volume.

Since lubrication is extremely difficult under the sliding condition in which the surface pressure at the coupling sections of the construction equipment exceeds 600 kg/cm² and the sliding speed is 2 mm/mm or less, the iron based oil retaining bearing does not work satisfactorily as a contact material in many cases. As described later, materials containing an Fe—Al based ordered phase do not seize at a high surface pressure which is no less than three times the pressure which Fe—C—Cu based oil retaining sintered bearings can withstand, and it is therefore desirable to use these materials under the above-described extremely severe condition.

A representative example of the above materials containing an Fe—Al based ordered phase is Fe—Cu—Al based porous sintered contact materials containing at least 2 to 30 wt % Al.

When used under a sliding condition with higher load and lower sliding speed, copper based porous contact materials are preferable, because their Young's moduli are about one half of that of steel, the area in contact with the implement pin increases with reduced surface pressure, and they are unlikely to chemically seize up with respect to steel. Although copper based porous contact materials are generally known to be soft and poor in wear resistance, the Cu—Al—Sn based materials and Cu—Al—Ti based porous sintered contact materials which contain a βhard phase in their structures and have been previously proposed by the present inventors in U.S. Pat. No. 6,613,121 are extremely effective. It is therefore desirable to use these porous sintered contact materials.

Since the copper-based porous sintered contact materials and the like are very expensive, it is economically disadvantageous to form the entire implement bushing from the sintered material as described earlier. Therefore, the present embodiment employs a structure in which a thin porous sintered contact material is integral with the inner circumferential surface of a cylindrical or substantially cylindrical backing made from a high strength steel as shown in FIG. 1.

Although the integration may be carried out by sinter bonding, it is more preferable in view of cost to press a cylindrical or substantially cylindrical metal based porous sintered contact material into the bore of the backing or bond it to the inner circumferential surface of the backing. In this case, the substantially cylindrical metal based porous sintered contact material may be formed in such a way that a sheet-like material is roundly bent or a roundly bent material is further welded and clinched.

Figure 7:
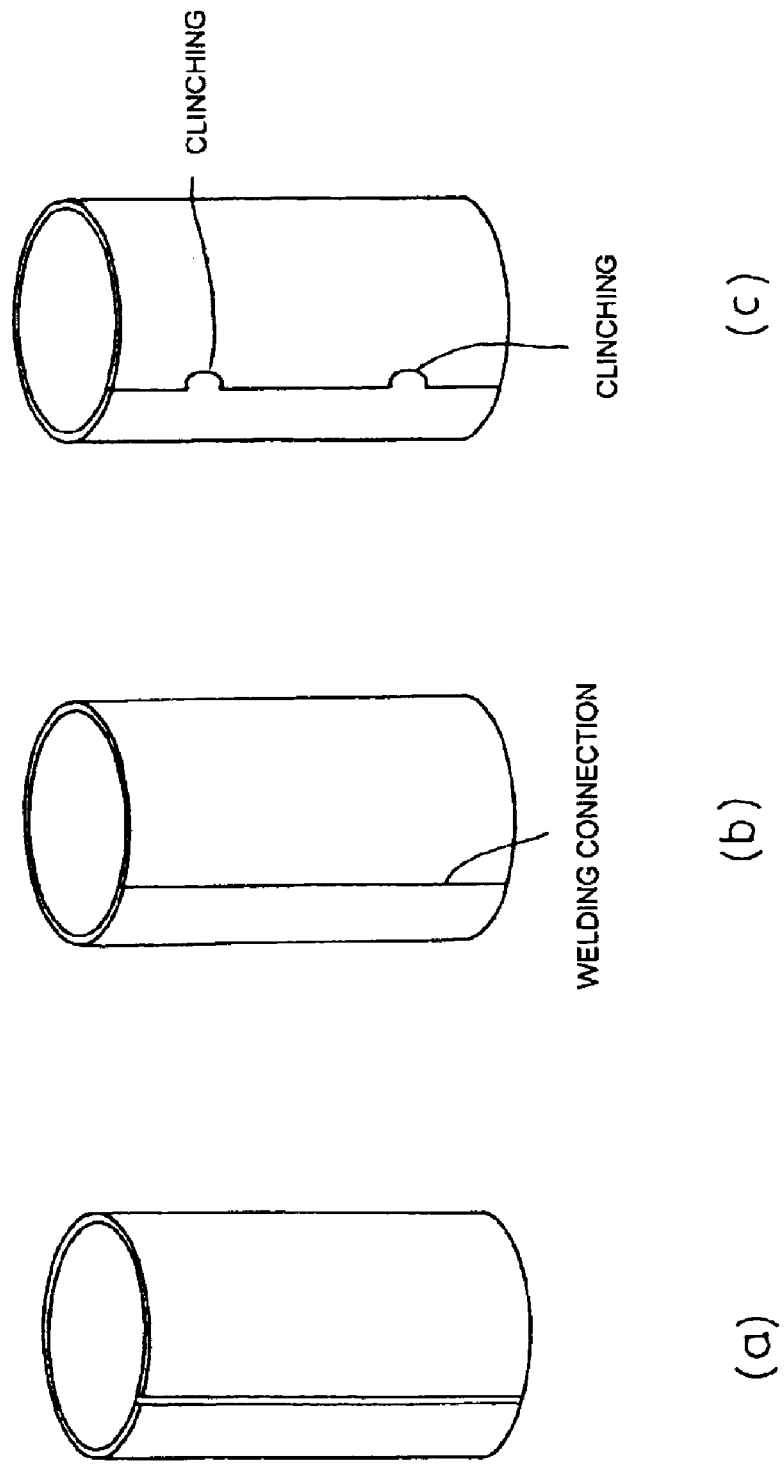
FIGS. 7(a), 7(b) and 7(c) are explanatory views each showing a method for forming a metal based contact material.

More concretely, one integration method is such that a sheet-like contact material is roundly bent into a cylindrical shape, forming a cylindrical body and when this cylindrical body is set in an implement bushing, its end faces are butted against each other utilizing a fitting force (see FIG. 7(a)). Another method is as follows. A sheet-like contact material is roundly bent into a cylindrical shape, forming a cylindrical body which is then but-welded (see FIG. 7(b)). A still another method is such that a sheet-like contact material is roundly bent forming a cylindrical body both end faces of which are then clinch-welded (see FIG. 7(c)). It is obvious that for incorporating the metal based contact material into an implement bushing having a groove at its inner circumference, a metal based contact material formed into a cylindrical or substantially cylindrical shape may be extended.

Since the implement bushing is often press-fitted at its coupling section as described earlier, it is preferable to ensure a hardness of HRC 20 or more in order to reduce galling at the time of the press-fitting.

Figure 8:
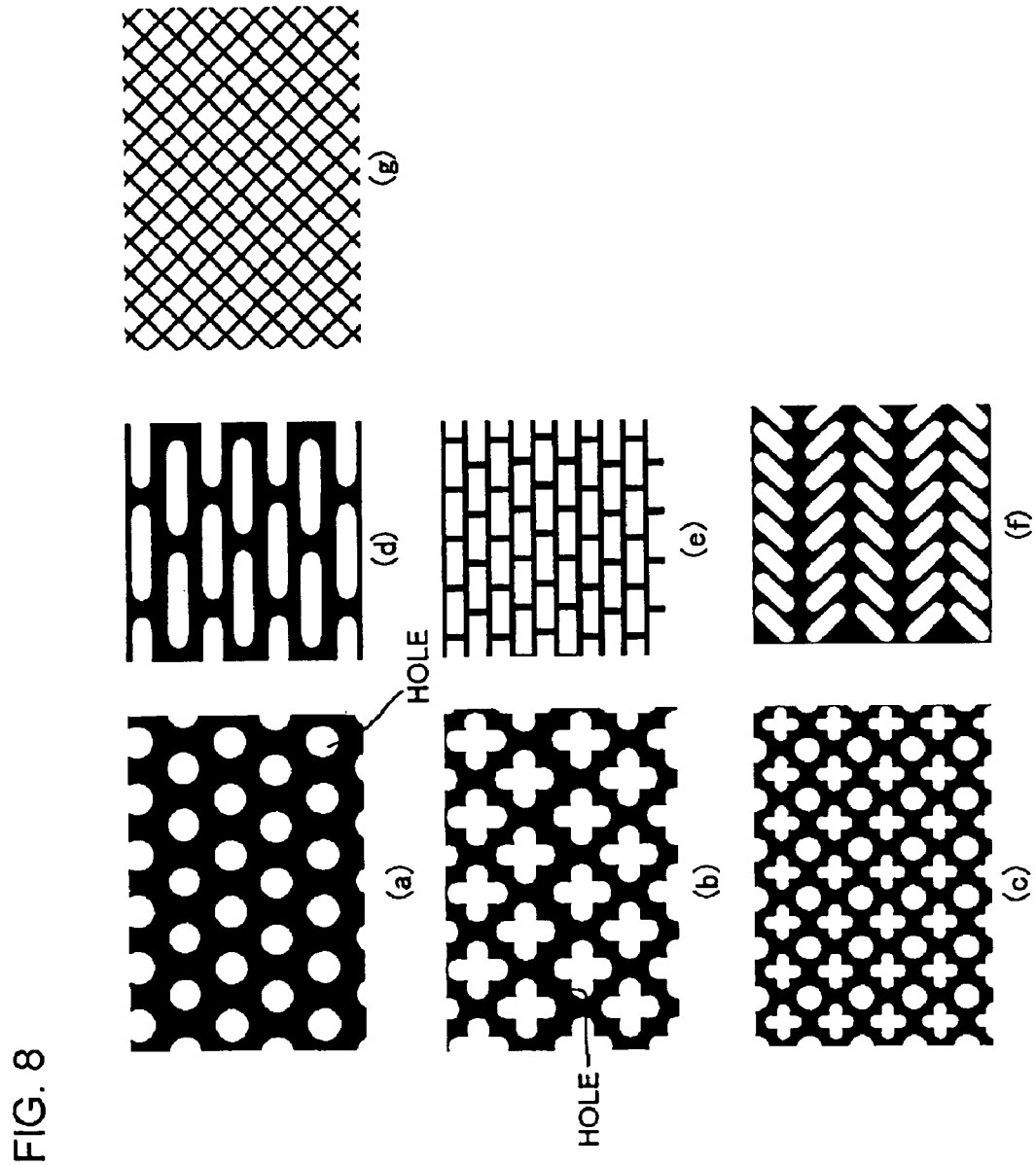
FIGS. 8(a) to 8(g) show examples of the metal based contact material.

For allowing the metal based porous sintered contact material integral with the backing to retain a larger amount of lubricating oil and/or lubricant such as grease, it is preferable to form holes in the contact material. Such holes may assume various shapes and can be easily made by machining a thin, cylindrical metal based contact material. In addition, it is preferable to roundly bend a sheet-like metal based contact material in which holes are made by press work, because such a punching metal (see FIG. 8) has good commercial availability and can be processed at low cost.

During the construction equipment is in service, a thrust force axially acts on the coupling section between the implement pin and the implement bushing, and a pulling-out force axially acts on the metal based porous sintered contact material. Therefore, it is preferable to force the metal based porous sintered contact material into the bore of the implement bushing or bond it to the inner circumference of the implement bushing. Taking account of long-time stability, it is more preferable to form a groove in the inner circumference of the backing of the implement bushing and process the metal based porous sintered contact material so as to have a configuration which fits the shape of the groove, whereby coming-off due to the thrust force is prevented by the groove (see FIG. 3).

Further, in the present embodiment, an oil sealing device such as lip seals is disposed in each end face of the backing of the implement bushing to seal the gap between the outer circumferential surface of the implement pin and the implement bushing, so that an improved grease and lubricating oil retention ability can be achieved while preventing penetration of earth, soil and sea water from outside to improve the seizure resistance and wear life of the implement coupling device (see FIG. 3).

FIGS. 9(a) to 9(h) show sectional views of an implement coupling device according to another embodiment of the invention.

Figure 9:
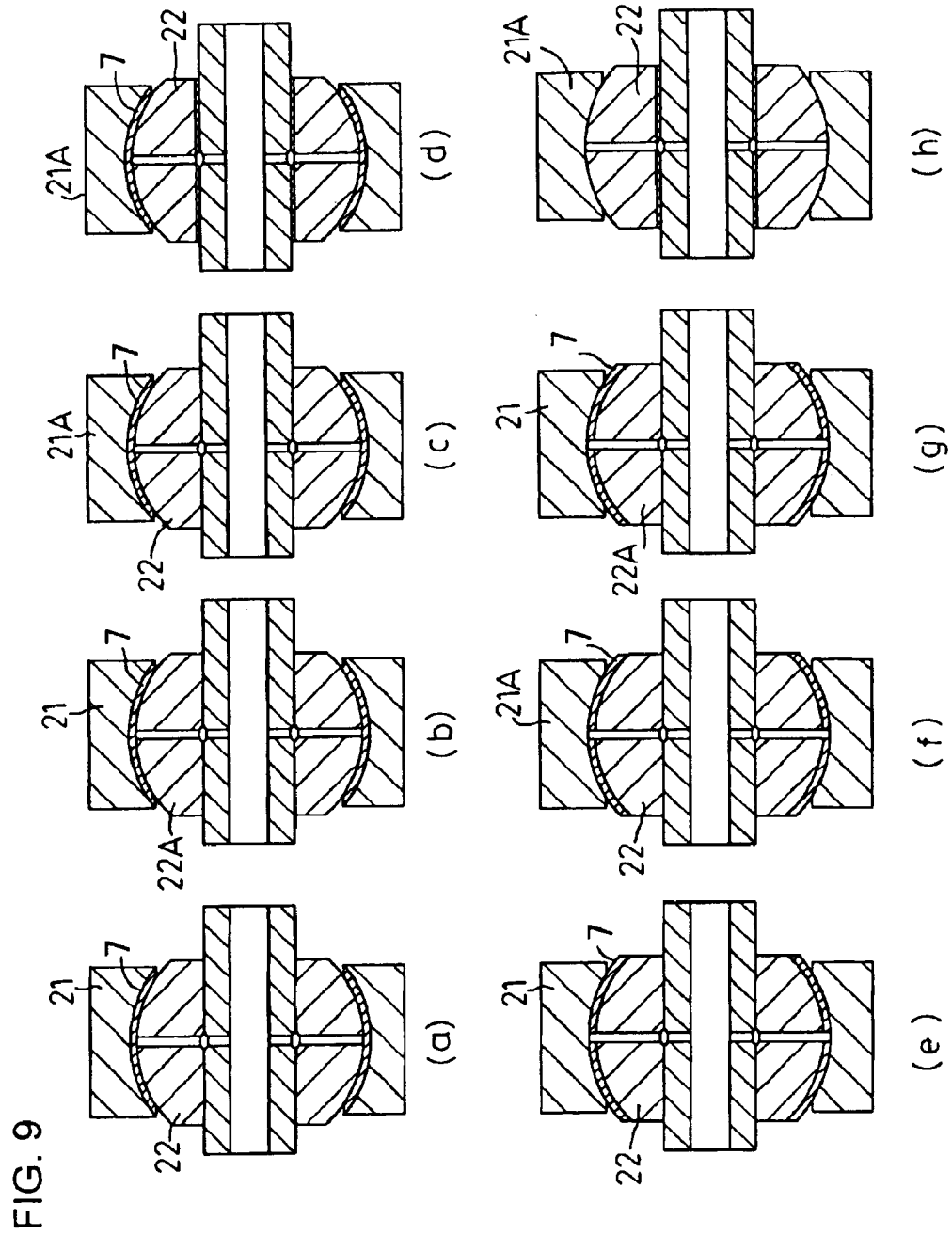
FIGS. 9(a) to 9(h) are sectional views each showing an application of the invention to a spherical bushing.

The present embodiment is associated with applications of the invention to spherical bushings. FIGS. 9(a) to 9(b) show applications in which the metal based contact material 7 is integral with the inner circumference of an outer ring 21 (21A), whereas FIGS. 9(e) to 9(g) show applications in which the metal based contact material 7 is integral with the outer circumference of an inner ring 22 (22A). FIGS. 9(d) and 9(h) show applications in which the metal based contact material 7 is integral with the inner circumference of an inner ring 22. The outer ring 21 and the inner ring 22 are made from ingot steel, whereas the outer ring 21A and the inner ring 22A are made from high-strength sintered steel.

Next, concrete examples of the invention will be described.

EXAMPLE 1

Measurement of a Stress Imposed on an Implement Pin of an Actual Vehicle

Figure 4:
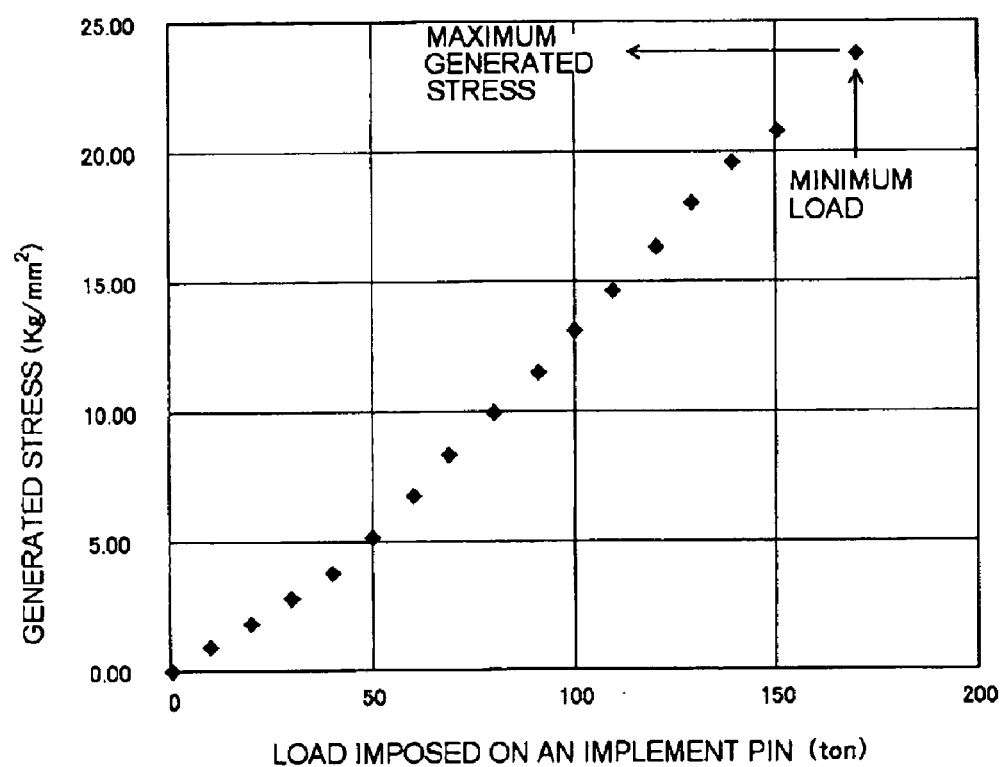
FIG. 4 is a graph of cylinder axial force versus the bending stress exerted on the outer circumferential surface of the implement pin.

In this example, the construction equipment PC 300 produced by KOMATSU LTD. was used and a cylinder axial force at the bottom of a bucket cylinder and a bending stress imposed on an implement pin for the bucket cylinder was measured using strain gages. It is known that the severest load is applied to the bottom of a bucket cylinder during operation when the angle of the face cutting stroke end arm is 90°. FIG. 4 shows loads calculated from the axial force and the measurement results of the bending stress imposed on the outer circumference ($\phi$ 90 mm) of a solid implement pin. The maximum load and the maximum stress imposed on the outer circumference of the solid implement pin were 170.9 ton and 23 kg/mm$^2$, respectively. The problem of breakage caused by radial squeezing becomes serious as mentioned earlier where the cylindrical implement pin is too thin, and therefore, Z is set to 0.6 or more and the thickness to outside diameter ratio is set to 0.1 or more in the present example.

EXAMPLE 2

Breakage of an Implement Pin Caused by Radial Squeezing Fatigue

Figure 10:
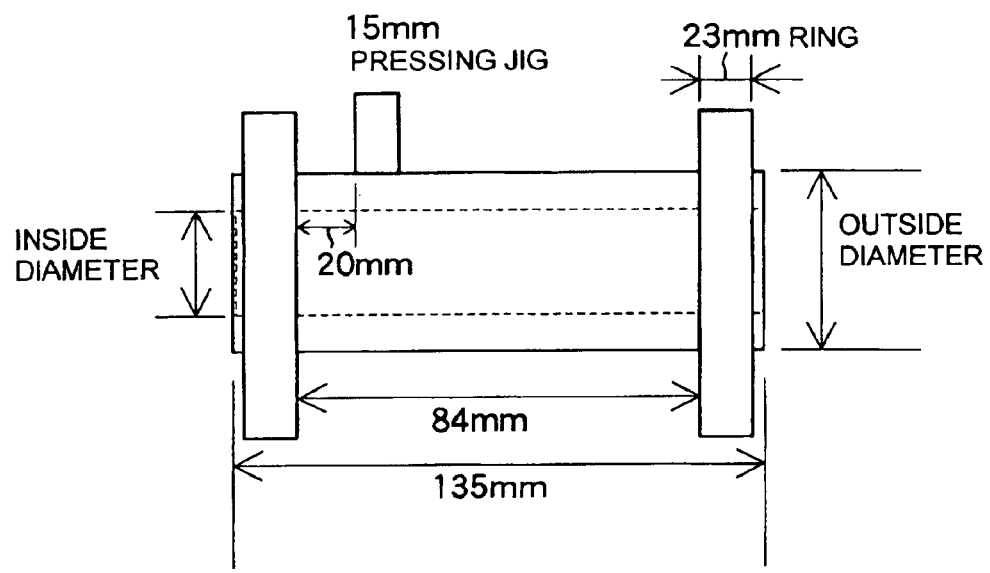
FIG. 10 is an explanatory diagram of a radial squeezing fatigue test conducted on the implement pin.

In this example, the outside diameter and length of an implement pin were set to 60 mm and 140 mm, respectively, and the inner diameter was varied such that the thickness to outside diameter ratio takes values of 0.175, 0.145 and 0.1. Such an implement pin was mounted on a jig as shown in FIG. 10 to undergo a fatigue test. A research was made to check the effect of the hardness of the inner circumference of the implement pin on the strength against breakage which is caused by a radial squeezing tensile stress, starting from the inner circumference. Samples of three levels were prepared for the implement busing. (i) Level 1: An S45C carbon steel pipe was used and its outer circumferential surface and inner circumferential surface were quenched by induction hardening such that the hardened depth of the area having a hardness of HRC 45 was about 3 mm. Then, tempering at 180° C. was carried out for 3 hours (the hardness of the inner circumferential hardened layer=HRC 57); (ii) Level 2: Level 2 is similar to the Level 1 except that the inner circumferential surface was unquenched (the hardness of the inner circumference=HRC 18); (iii) Level 3: An SCrB440 steel pipe was entirely heated to 850° C. for 30 min and then oil-quenched, followed by tempering at 300° C. for 3 hours (through hardness=HRC 50).

Figure 11:
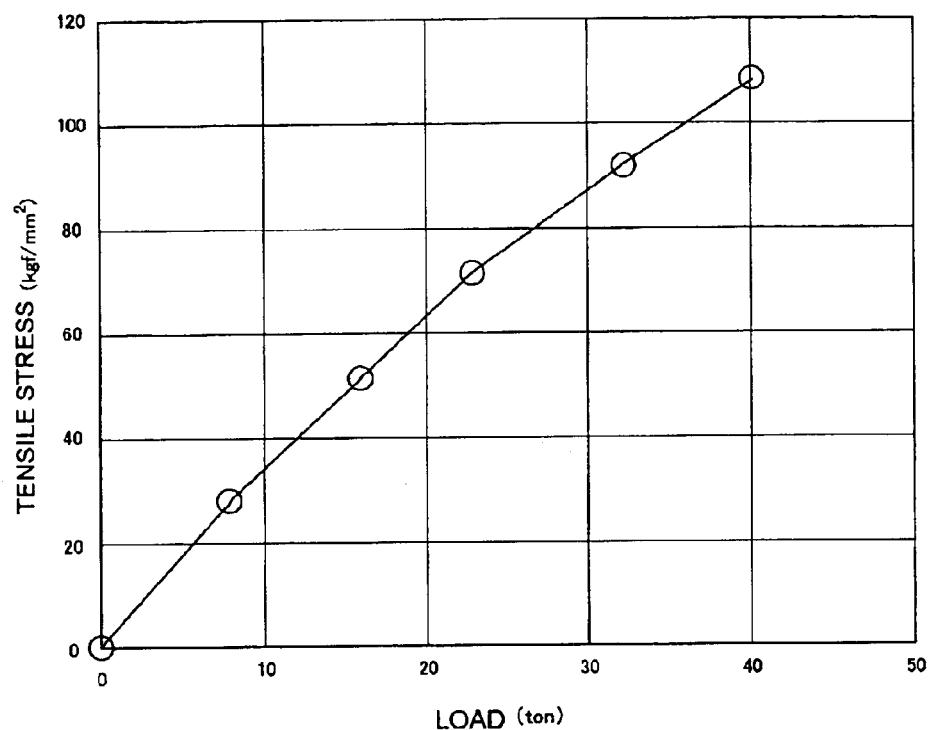
FIG. 11 is a graph of load versus radial squeezing tensile stress.

FIG. 11 shows generated stress measured by strain gages attached to the loaded points (shown in FIG. 11) in the inner circumference of the cylindrical implement pin of Level 1 having a thickness to outside diameter ratio of 0.175. The outside diameter $\phi$ 60 mm) of the implement pin used in the present example is equal to the outside diameter adopted in the construction equipment PC100 (9.5 ton) produced by KOMATSU LTD. The maximum load in the measurements is about four times the load imposed on the vehicle body.

Figure 12:
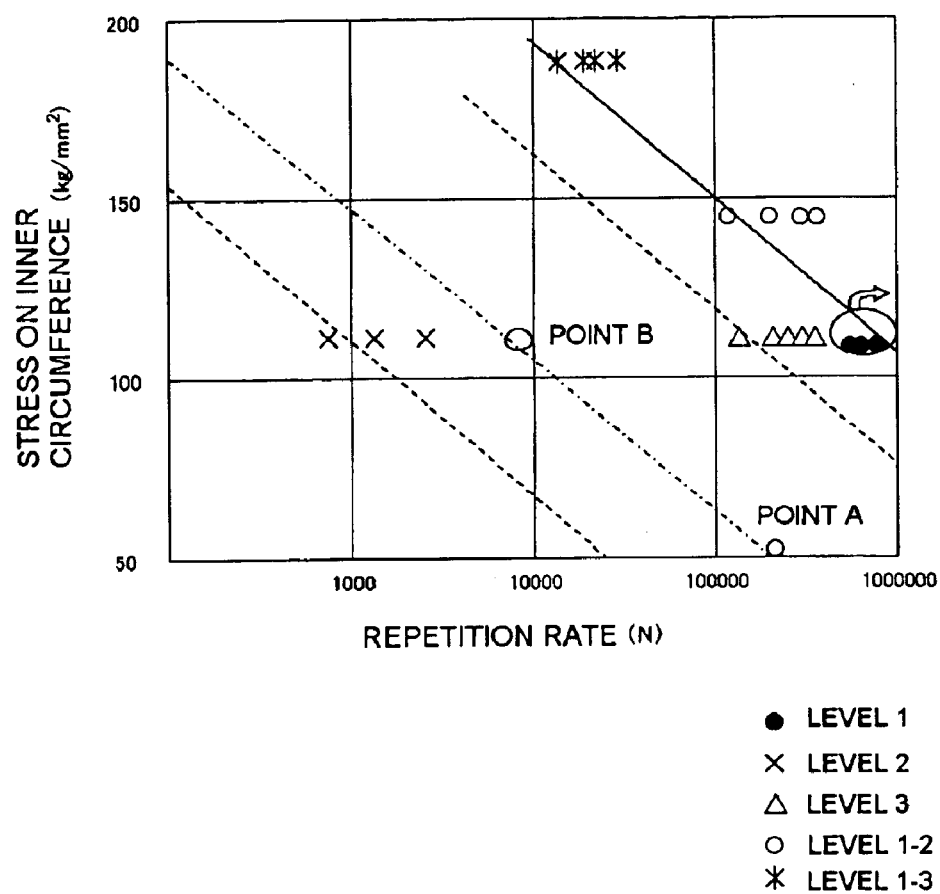
FIG. 12 is a graph of the destruction fatigue strength of the inner circumference of the implement pin.

The fatigue test conditions are as follows. On assumption that the load acts on an actual implement pin is about two times the load of the vehicle body, the fatigue test load was set to 38 ton to conduct acceleration tests with a load which was twice the load of the vehicle body. While measuring tensile stress imposed on the inner circumference portion of each specimen (cylindrical implement pin), the relationship between the number of stress imposing cycles and occurrence of cracking in the inner circumferential portion was obtained. Since a breaking point in a strain gage was regarded as a start of cracking, several hundred times of detection delays could not be avoided and as a result, the detection accuracy of specimens which were broken in low cycle fatigue testing could not be prevented from becoming relatively poor. The test results of the present example are collectively shown in FIG. 12. It should be noted that Level 1-2 and Level 1-3 are specimens obtained by applying the same thermal treatment as that of Level 1 to implement pins having thickness to outside diameter ratios of 0.145 and 0.10, respectively.

Figure 13:
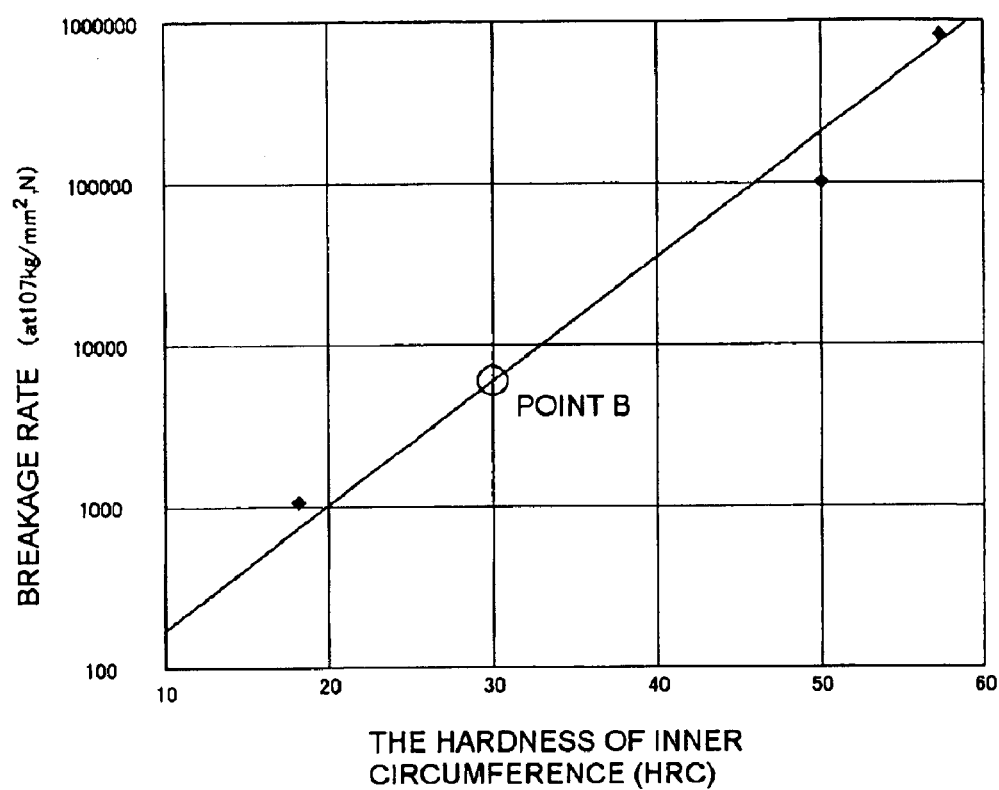
FIG. 13 is a graph of the hardness of the inner circumference portion versus the number of occurrences of breakage.

It is understood from the test results that as the hardness of the inner circumferential portion increases, the strength increases. Taking account of the above-described research on the actual stress (25 kg/mm$^2$ or less) imposed on an implement pin as well as the facts that where the modulus of section is assumed to be 0.6 times, the stress is about 43 kg/mm$^2$; that the radial squeezing tensile stress imposed at that time does not exceed 50 kg/mm$^2$; and that the maximum number of stress imposing cycles applied to an implement pin does not exceed one hundred thousand times on the basis of the actual life of the vehicle (ten to twenty thousand hours), the hardness of the inner circumference portion may be HRC 30 or more, and more preferably, HRC 35 or more (see point B in FIG. 13). Based on the same basis, it is apparently preferable that the thickness to outside diameter ratio of an implement pin be 0.1 or more.

Although induction hardening is employed as a thermal treatment applied to the inner circumference portion of a hollow implement pin TP in the present example, it is, in fact, difficult to quench the inner circumference portion with a high frequency coil being inserted in the bore of the implement pin, because the outside diameter to length ratio of an actual implement pin is as small as 0.1 and the inside diameter to length ratio of the cylindrical implement pin of the invention is 0.1 or less in many cases. In view of this, it is obviously desirable for the invention to take a method in which, as previously proposed by the inventors, after an implement pin has been entirely heated to a quenching temperature, the inner circumference is quenched by an intratube laminar flow of a cooling medium running within the bore whereas the outer circumference is quenched by an ordinary technique such as water spray.

Figure 14:
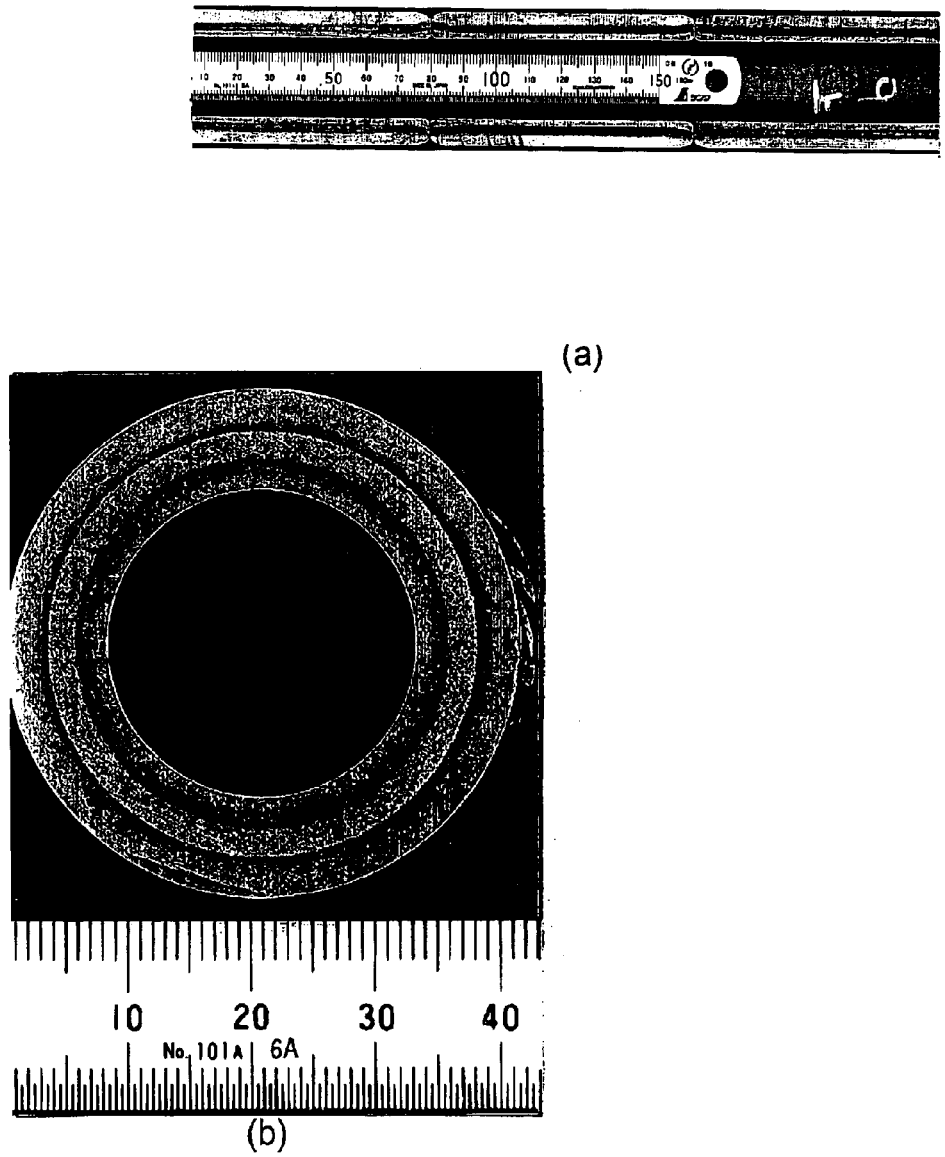
FIGS. 14(a) and 14(b) are macro pattern photographs showing a longitudinal section and a cross section, respectively.

FIG. 14 is a photograph showing a quench structure of three cylindrical bodies in an overlapped condition (inside diameter to length ratio=0.1), each cylindrical body being made from S45C carbon steel (Di value=0.9 inch) and having an outside diameter of 41.3 mm, inside diameter of 24.5 mm, and length of 81 mm. This structure was obtained in the following way. The cylindrical bodies in an overlapped condition were heated to about 900° C. by induction heating from the outer circumferential surfaces, and then, intratube laminar flow cooling of their inner circumferences was started while continuing induction heating from the outer circumferential surfaces. 5 seconds later, the induction heating from the outer circumference was stopped and the outer circumferential surface was cooled by water spray. It is understood from this photograph that a uniform hardened layer (HRC 60) is formed on the inner circumference and the outer circumference, and an unquenched softened layer (HRC 27) is formed between these hardened layers. By use of the above quenching process, a quench hardened layer distribution, in which a soft layer is formed in the widthwise center, can be easily formed even in a thin cylindrical implement pin of small bore, the distribution providing strength against the above-described radial squeezing tensile stress. In addition, this quenching method is applicable to thick cylindrical implement pins made from inexpensive carbon steel having low hardenability and accordingly, has a remarkable economical merit.

EXAMPLE 3

Production of a Cu—Al Based Sintered Plate and Sliding Test Results

Figure 15:
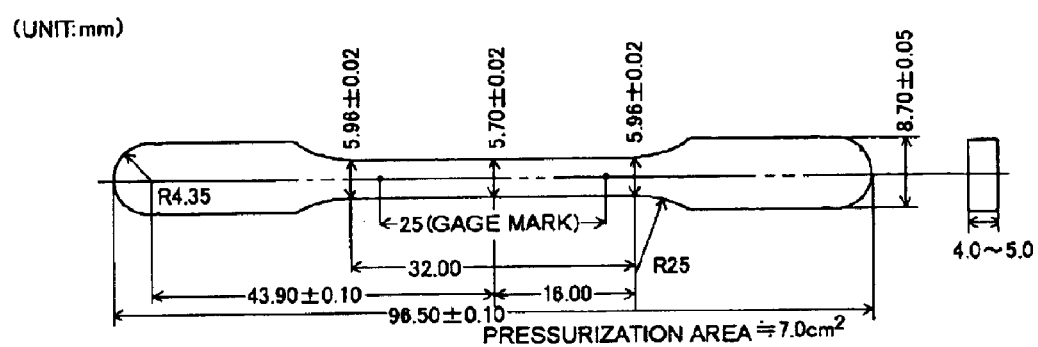
FIG. 15 shows a shape of a tensile test specimen.

The mixed powders shown in Table 1 were prepared by blending an Al powder, Sn powder, TiH powder, Si powder, Mn powder, Ni powder, phosphor iron powder, and electrolytic copper powder (CE15 produced by Fukuda Metal Foil & Powder Co., Ltd.) which had a size of 300 meshes or less. These powders were compacted at a compacting pressure of 4 ton/cm$^2$, using a die for tensile tests. This die is stipulated by JIS and shown in FIG. 15. After sintered at 850° C., 900° C., and 960° C. under a pressure of 0.01 torr in a vacuum sintering furnace for one hour, these compact specimens were rolled to such a degree that they were not cracked and, subsequently, resintered at the same temperatures for one hour. The hardness of each specimen (2S1R material) thus prepared was measured. Further, the sliding properties of each specimen were evaluated by measuring its seizure limit value (PV value) and wear amount (Δ Wmm) at the seizure limit from the surface pressure at which the coefficient of friction abruptly rises and sliding speed, using the constant speed friction and wear test method.

TABLE 1

| No | Cu(CE) | Al | Sn | Ti | Si | Mn | Ni | Fe27P | 2S1R (900) Hv | 2S1R (960) Hv | 2S1R (850) Hv | PV VALUE | WEAR AMOUNT (mm) | SINTERING TEMPERATURE | STRUCTURE |
|---|---|---|---|---|---|---|---|---|---|---|---|---|---|---|---|
| 1 | Bal. | 7 | 0 | | | | | | 72 | 81 | 79 | 2500 | 0.24 | 900 | α |
| 2 | Bal. | 9 | 0 | | | | | | 84 | 103 | 89 | | | | |
| 3 | Bal. | 10 | 0 | | | | | | 85 | 93 | 94 | 4000 | 0.16 | 900 | α + β |
| 4 | Bal. | 11 | 0 | | | | | | 82 | 99 | 105 | | | | |
| 5 | Bal. | 10 | 3 | | | | | | 67 | 80 | 77 | 7000 | 0.11 | 900 | α + β |
| 6 | Bal. | 10 | 6 | | | | | | 76 | 72 | 75 | 8000 | 0.08 | 900 | β |
| 7 | Bal. | 10 | 9 | | | | | | 63 | | 70 | | | | |
| 8 | Bal. | 4 | 6 | | | | | | 73 | | 72 | 4500 | 0.12 | 900 | α |
| 9 | Bal. | 5 | 6 | | | | | | 57 | | 73 | | | | |
| 10 | Bal. | 6 | 6 | | | | | | 73 | | 69 | 5500 | 0.09 | 900 | α + β |
| 11 | Bal. | 7 | 6 | | | | | | 65 | 80 | 75 | | | | |
| 12 | Bal. | 8 | 6 | | | | | | 78 | 82 | 79 | 8000 | 0.07 | 900 | α + β |
| 13 | Bal. | 2 | 11 | | | | | | 52 | | 80 | | | | |
| 14 | Bal. | 3 | 11 | | | | | | | | 81 | | | | |
| 15 | Bal. | 4 | 11 | | | | | | | | 58 | 4500 | 0.21 | 850 | α |
| 16 | Bal. | 5 | 11 | | | | | | | | 62 | 8000 | 0.09 | 850 | α + β |
| 17 | Bal. | 6 | 11 | | | | | | 77 | | 64 | 7500 | 0.06 | 850 | α + β |
| 18 | Bal. | 7 | | 1 | | | | | 147 | | | 3500 | 0.19 | 900 | α |
| 19 | Bal. | 8 | | 1 | | | | | 151 | | | | | | |
| 20 | Bal. | 9 | | 1 | | | | | 161 | | | | | | |
| 21 | Bal. | 10 | | 1 | | | | | 168 | | | 4000 | 0.07 | 900 | α + β |
| 22 | Bal. | 11 | | 1 | | | | | 162 | | | | | | |
| 23 | Bal. | 12 | | 1 | | | | | 136 | | | | | | |
| 24 | Bal. | 14 | | 1 | | | | | 108 | | | | | | |
| 25 | Bal. | 7 | | 3 | | | | | 136 | | | | | | |
| 26 | Bal. | 9 | | 3 | | | | | 147 | | | | | | |
| 27 | Bal. | 11 | | 3 | | | | | 165 | | | | | | |
| 28 | Bal. | 7 | 3 | 1 | | | | | 162 | | | | | | |
| 29 | Bal. | 9 | 3 | 1 | | | | | 155 | | | 6500 | 0.04 | 900 | α + β |
| 30 | Bal. | 11 | 3 | 1 | | | | | 134 | | | | | | |
| 31 | Bal. | 10 | 3 | 3 | | | | | 138 | 193 | 146 | 7500 | 0.02 | 900 | α + β |
| 32 | Bal. | 10 | 6 | 3 | | | | | 89 | 188 | 96 | 6500 | 0.03 | 900 | β |
| 33 | Bal. | 7 | | 1 | 2 | | | | 110 | | | | | | |
| 34 | Bal. | 9 | | 1 | 2 | | | | 117 | | | | | | |
| 35 | Bal. | 11 | | 1 | 2 | | | | 103 | | | | | | |
| 36 | Bal. | 10 | 3 | 1 | 1 | | | | 82 | 124 | 106 | 8000 | 0.03 | 900 | α + β |
| 37 | Bal. | 10 | 6 | 1 | 1 | | | | 103 | 192 | 67 | 7000 | 0.04 | 900 | β |
| 38 | Bal. | 7 | | 1 | | 3 | | | 155 | | | | | | |
| 39 | Bal. | 9 | | 1 | | 3 | | | 157 | | | | | | |
| 40 | Bal. | 11 | | 1 | | 3 | | | 158 | | | | | | |
| 41 | Bal. | 10 | 3 | 1 | | 3 | | | 136 | 159 | 132 | 7500 | 0.02 | 960 | α + β |
| 42 | Bal. | 10 | 6 | 1 | | 3 | | | 121 | 162 | 103 | 6500 | 0.02 | 960 | β |
| 43 | Bal. | 7 | | 1 | | | 4 | | 147 | | | | | | |
| 44 | Bal. | 9 | | 1 | | | 4 | | 135 | | | | | | |
| 45 | Bal. | 11 | | 1 | | | 4 | | 138 | | | | | | |
| 46 | Bal. | 10 | 3 | 1 | | | 3 | | 115 | 155 | 136 | 8000 | 0.01 | 960 | α + β |
| 47 | Bal. | 10 | 6 | 1 | | | 3 | | 88 | 164 | 88 | 7000 | 0.03 | 960 | β |
| 48 | Bal. | 7 | | 1 | | | | 4 | 80 | | | | | | α |
| 49 | Bal. | 9 | | 1 | | | | 4 | 73 | | | | | | |
| 50 | Bal. | 11 | | 1 | | | | 4 | 73 | | | | | | |
| 51 | Bal. | 10 | 3 | 1 | | | | 3 | 79 | 79 | 69 | 7000 | 0.02 | 960 | α + β |

TABLE 1-continued

| No | Cu(CE) | Al | Sn | Ti | Si | Mn | Ni | Fe27P | 2S1R (900) Hv | 2S1R (960) Hv | 2S1R (850) Hv | PV VALUE | WEAR AMOUNT (mm) | SINTERING TEMPERATURE | STRUCTURE |
|---|---|---|---|---|---|---|---|---|---|---|---|---|---|---|---|
| 52 | Bal. | 10 | 6 | 1 | | | 3 | | 82 | 113 | 61 | 6500 | 0.04 | 960 | β |
| 53 | Bal. | 5 | 0 | 1 | | | | | 150 | | | 4500 | 0.08 | 900.5 min | α |
| 54 | Bal. | 5 | 3 | 1 | | | | | 169 | 3S2R | | 6500 | 0.02 | 900.5 min | α + β |
| 55 | Bal. | 5 | 3 | 1 | 2 | | | | 157 | | | | | 900.5 min | α |

Figure 16:
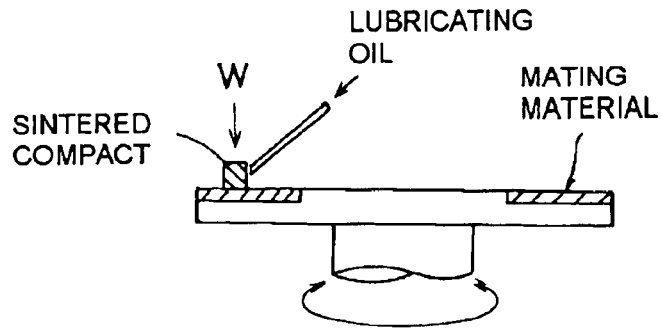
FIGS. 16(a) and 16(b) show a conceptual diagram of a constant speed friction and wear tester and a sliding test specimen holder, respectively.
Figure 16:
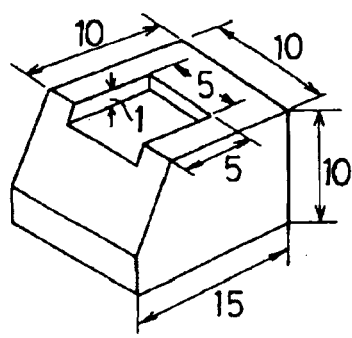

FIG. 16 shows a conceptual view of a constant speed friction and wear tester, a sliding test specimen holder, and sliding test conditions. Each sliding test specimen was processed into a 5×5 mm square sheet having a thickness of 2 mm and set in a sliding test specimen holder. The sliding test was started with a surface pressure of 100 kg/cm$^2$ and when there occurred no abnormalities in the coefficient of friction and wear, surface pressure was raised up to 800 kg/cm$^2$ by 50 kg/cm$^2$ each time within 5 minutes.

The measurement results of the Vickers hardness (Hv), PV value and wear amount of each specimen are collectively shown in Table 1. The following facts have been found from the results.

(1) Addition of Sn to Cu—Al has virtually no effect of increasing hardness. As Al concentration increases, hardness slightly increases, but if a material has a single β phase structure, it becomes difficult to roll the material, resulting in low hardness.

(2) The hardness increasing effect of Ti addition to Cu—Al and Cu—Al—Sn based sintered compacts is remarkable and increases as sintering temperature increases, because of facilitation of alloying of Ti. The same function can be observed in the cases of Mn, Ni and Si.

(3) As a result of evaluation of the sliding properties by the constant speed friction and wear test, it has been found that Sn addition contributes to improvements in the sliding properties of the materials having an α phase, (α+β) double phase, or β phase structure.

(4) Compared to the soft materials having an α phase structure, the sliding properties of the materials having an (α+β) double phase or β phase structure have been considerably improved.

(5) Addition of Ti, Si, Mn or Ni has proved to be effective in improving wear resistance.

Nos. 53 to 55 shown in Table 1 represent specimens (3S2R materials) which have been subjected to vacuum-sintering at 900° C. for a short time, namely, 5 minutes and then rolling and sintering twice. The effect of this is observed in the specimen No. 54 in which a β phase in a non-equilibrium state is finely precipitated along the grain boundary and the sliding properties have been improved.

In this example, the sintered bodies are rolled with the maximum rolling ratio which fall within such a range that no cracking occur and the relative sintered densities of the sintered bodies often reach 98 or more at that time. Therefore, it is obvious that sintered plates having relative densities of 95 to 70% that are desirable for the invention can be produced by controlling the final rolling ratio. Further, where Al powder is directly used like the present example, compaction does not occur in vacuum sintering of a material containing the powder in a dispersed state, and it is therefore necessary to once consolidate the material before sintering.

As seen from the above description, a substantially cylindrical porous sintered contact material can be produced at low cost by bending a thin plate into a round shape and easily made to be integral with the implement pin and implement bushing of the present invention.

EXAMPLE 4

Metal Based Contact Material Having a Structure Capable of Oil Impregnation

Figure 17:
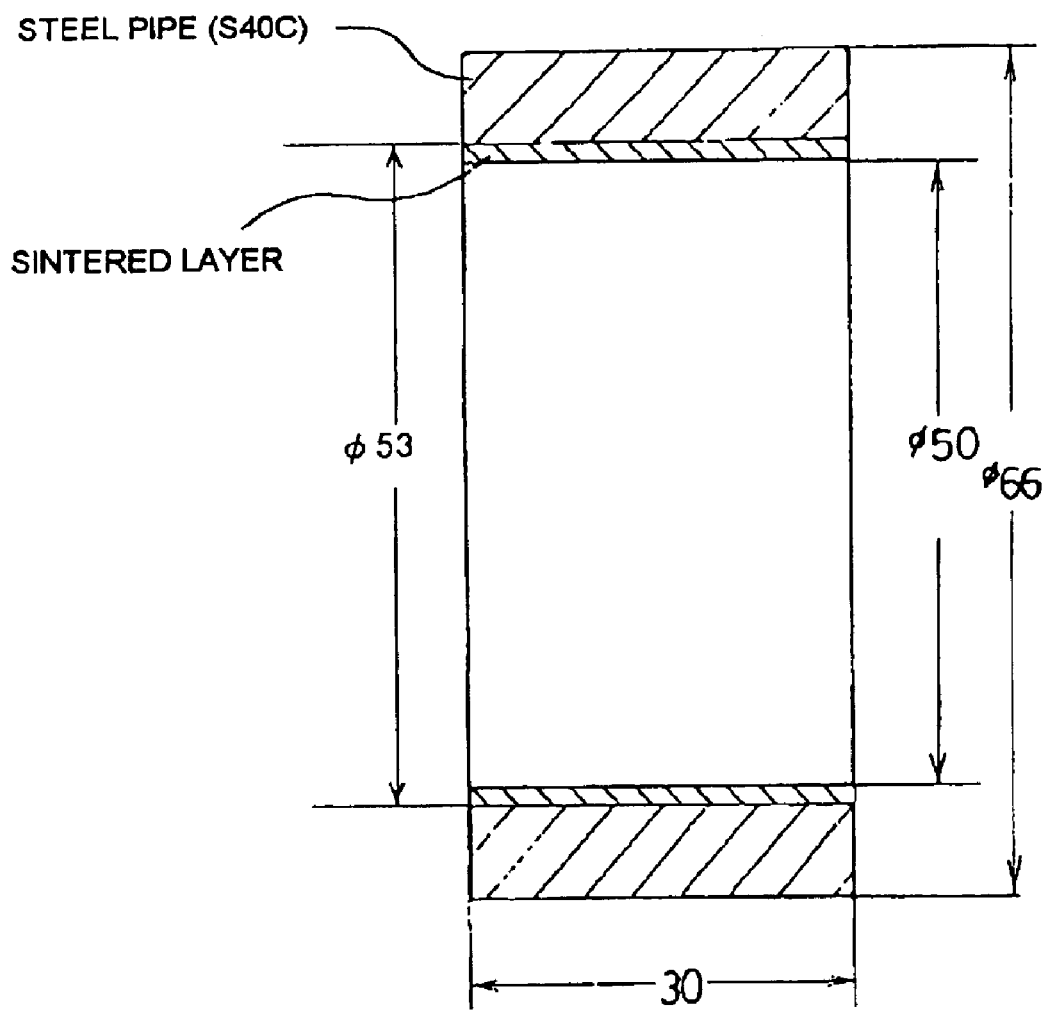
FIG. 17 shows a sectional view showing a shape of test specimens used in sliding tests.
Figure 18:
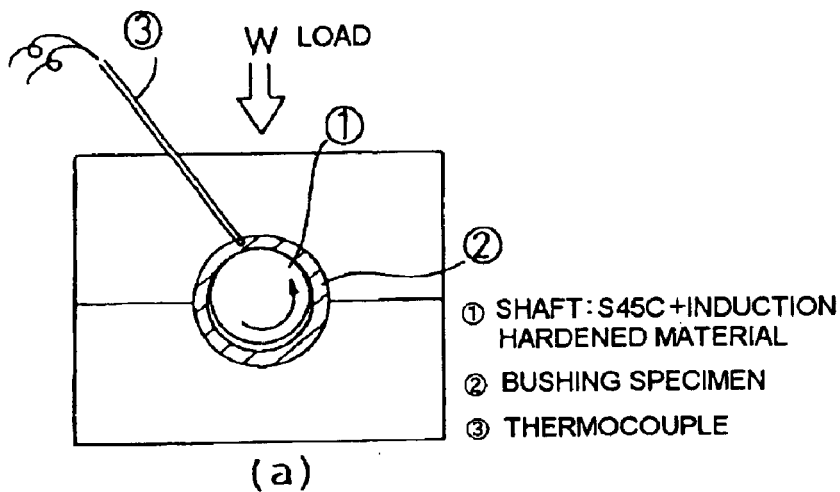
FIGS. 18(a) and 18(b) are a conceptual diagram of a tester for sliding tests and test conditions, respectively.
Figure 18:
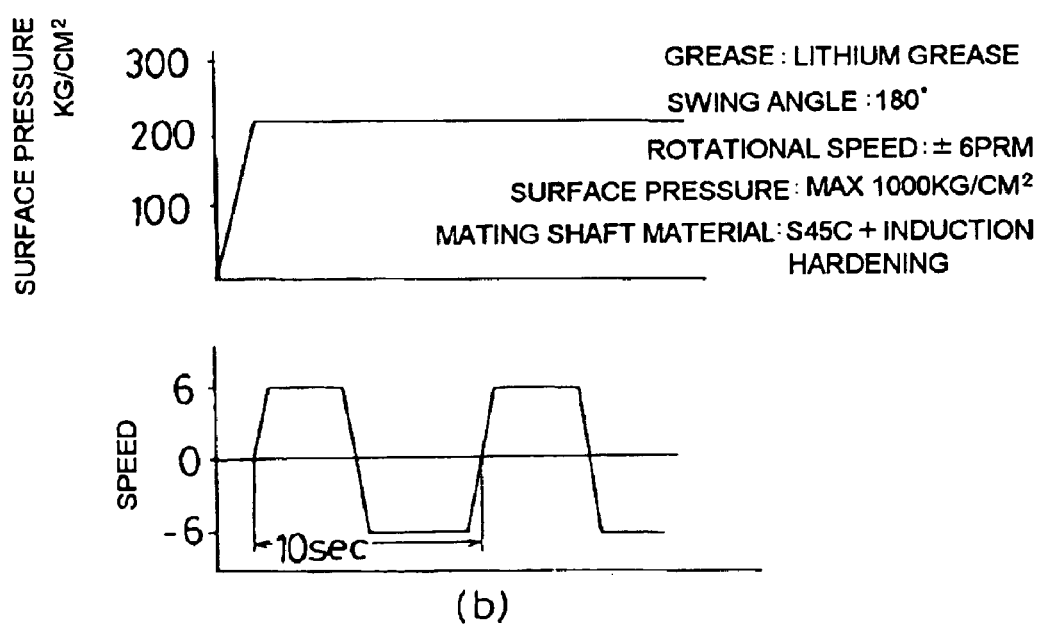
Figure 19:
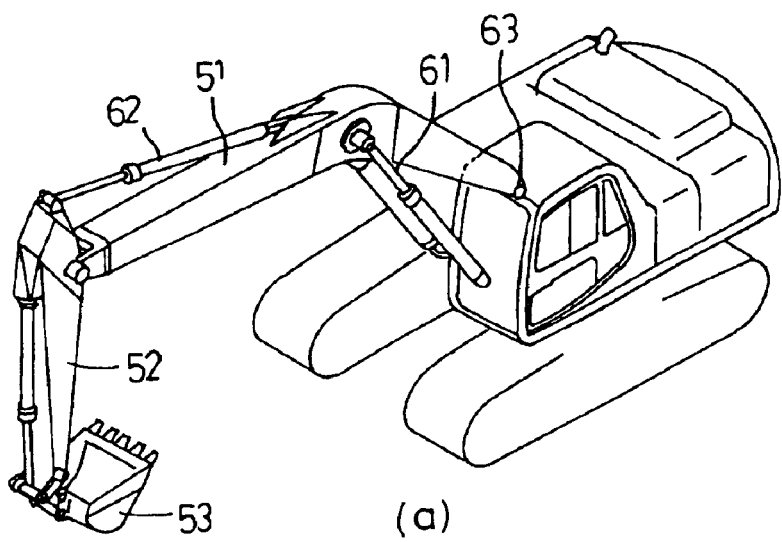
FIGS. 19(a) and 19(b) are a perspective view of an implement of a hydraulic excavator and a detailed view of a bucket coupling section, respectively.
Figure 19:
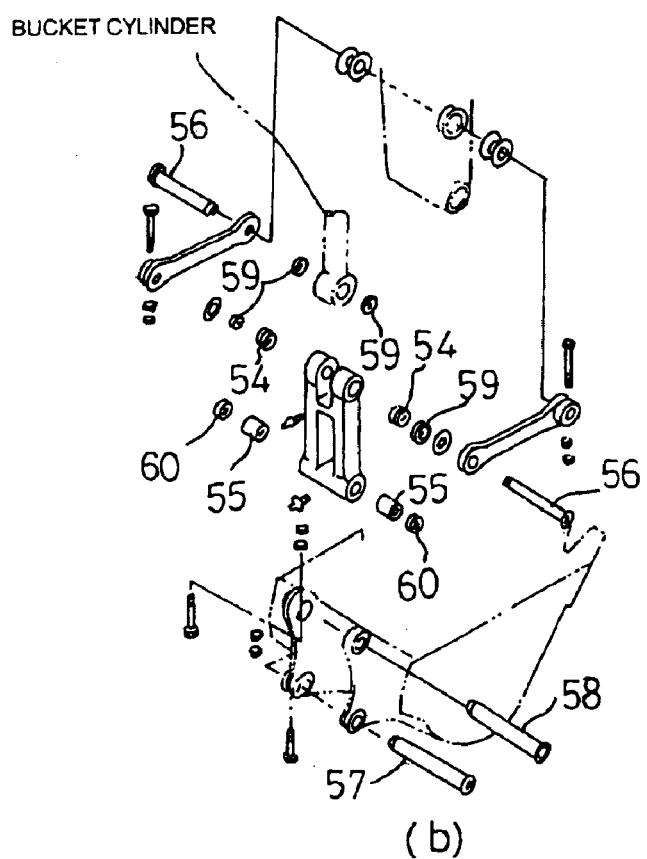

In this example, the seizure resistance of various kinds of metal based contact materials was checked when used in an implement and suitable contact materials were surveyed. To evaluate the sliding properties of the metal based contact materials, sliding test specimens such as shown in FIG. 17 were tested using the test method shown in FIG. 18. Concretely, the seizure resistance of each specimen was evaluated at a point where the coefficient of friction markedly rose, abnormal noise was made or abnormal wear occurred.

The metal based contact materials used in the present example are shown in Table 2. Specimen Nos. 1 to 5 are Al bronze based sintered contact materials and Specimen Nos. 6 and 7 are a bronze ingot material and a bronze sintered material, respectively. Further, the sliding properties of an Fe—C—Cu based oil retaining bearing material and Fe—Al—Cu based sintered contact materials were checked, using an S45C induction hardened material as a reference material.

TABLE 2

| No | Cu | Fe | Al | Sn | Ti | C | Fe27P | Ni | HARDNESS | STRUCTURE | CRITICAL SURFACE PRESSURE |
|---|---|---|---|---|---|---|---|---|---|---|---|
| 1 | Bal. | | 7 | | 1 | | | | 130 | α | 550 |
| 2 | Bal. | | 5 | 3 | 1 | | | | 170 | α + β | 700 |
| 3 | Bal. | | 10 | | 1 | 1 | | | 165 | α + β | 850 |
| 4 | Bal. | | 10 | 3 | 3 | 1 | | | 200 | α + β | 1000 |
| 5 | Bal. | | 10 | 5 | 3 | | | | 230 | β | 1000 |
| 6 | Bal. | | 9.4 | | | | | | 110 | α PHOSPHOR BRONZE INGOT MATERIAL | 300 |

TABLE 2-continued

| No | Cu | Fe | Al | Sn | Ti | C | Fe27P | Ni | HARDNESS | STRUCTURE | CRITICAL SURFACE PRESSURE |
|---|---|---|---|---|---|---|---|---|---|---|---|
| 7 | Bal. | | | 11 | 1 | | | | 120 | α BRONZE SINTERED MATERIAL | 400 |
| 8 | 15 | Bal. | | | | 0.8 | | | 600 | Fe OIL RETAINING BEARING MATERIAL | 250 |
| 9 | S45C | | | | | | | | 550 | MARTENSITE* | 150 |
| 10 | 20 | Bal. | 12 | | | | | | 295 | Fe—Cu—Al BASED | 950 |
| 11 | 30 | Bal. | 16 | 1 | 1 | | | | 300 | Fe—Cu—Al BASED | 900 |
| 12 | 40 | Bal. | 20 | | 0.5 | 1 | | | 315 | Fe—Cu—Al BASED | 1000 |
| 13 | 20 | Bal. | 16 | 2 | 0.2 | | 5 | | 325 | Fe—Cu—Al BASED | 850 |
| 14 | 30 | Bal. | 12 | 2 | 0.2 | | | 3 | 320 | Fe—Cu—Al BASED | 950 |

The test results are collectively shown in Table 2. Compared to the iron based contact materials, the copper based contact materials are preferable, and the oil retaining copper based sintered material is more preferable. Among others, the Al bronze based sintered materials are excellent. The sintered materials of Nos. 2 to 5 containing a β phase have good seizure resistance as well as extremely high hardness and therefore it is imaginable that they have good wear resistance.

It is preferable to withstand a contact surface pressure of 500 kg/cm² imposed on the implement bushing and the implement pin, that is, imposed on the contact material as pointed out earlier, and the Cu—Al based and Fe—Cu—Al based sintered contact materials having good surface pressure resistance are more preferable. Taking account of the fact that coupling devices for implements are not always subjected to such a harsh surface pressure condition as described earlier, the metal based contact material or metal based porous sintered contact material to be inserted is not limited to particular materials, according to the gist of the invention.

What is claimed is:

1. An implement coupling device which is composed of an implement bushing made from steel and an implement pin which are for use in an implement for construction equipment, wherein a metal based contact material having a porous structure capable of storing at least one of a lubricating oil and a lubricant and having 5 to 30% by volume pores is interposed in a gap defined by the implement bushing and the implement pin.

2. The implement coupling device according to claim 1, wherein the metal based contact material is holed and the hole is filled with at least one of the lubricating oil and the lubricant.

3. The implement coupling device according to claim 1, wherein the metal based contact material is a metal based porous sintered contact material and its mating contact material is a quench-hardened steel having a Rockwell C hardness of HRC 45 or more.

4. The implement coupling device according to claim 3, wherein the metal based porous sintered contact material is integral with an inner circumferential sliding contact portion of the implement bushing which is in sliding contact with the implement pin which is made from steel and in which at least its outer circumferential surface is thermally hardened to a Rockwell C hardness of HRC 45 or more.

5. The implement coupling device according to claim 3, wherein the metal based porous sintered contact material is integral with an outer circumferential sliding contact portion of the implement pin which is in sliding contact with the inner circumferential surface of the implement bushing which is made from steel and in which at least its inner circumference is thermally hardened to a Rockwell C hardness of HRC 45 or more.

6. An implement coupling device which is composed of an implement bushing made from steel and an implement pin which are for use in an implement for construction equipment, wherein
a metal based contact material having a porous structure capable of storing at least one of a lubricating oil and a lubricant is interposed in a gap defined by the implement bushing and the implement pin, and
wherein two cylindrical rings are provided such that each ring is disposed at an end face of the implement bushing with a sealing device or a sealing device and a thrust ring between, and while the cylindrical rings and the implement pin inserted in the bores of the rings being secured, the implement bushing and the implement pin are made to be integral with each other.

7. The implement coupling device according to claim 6, wherein at least one of the implement bushing and the implement pin have a rotatable structure so that the load surface of the metal based contact material can be changed at a proper time.

8. An implement coupling device which is composed of an implement bushing made from steel and an implement pin which are for use in an implement for construction equipment, wherein a metal based contact material having a porous structure capable of storing at least one of a lubricating oil and a lubricant is integral with the outer circumference of the implement pin.

9. The implement coupling device according to claim 8, wherein the implement pin is preferably processed into a cylindrical shape so as to store a lubricating oil and its inner circumference is hardened by heat treatment to a Rockwell C hardness of HRC 35 or more.

10. The implement coupling device according to claim 9, wherein a quench-hardened layer having a Rockwell C hardness of HRC 45 or more is formed in the outer circumference and inner circumference of the implement pin, wherein a softened layer is formed between the outer circumferential hardened layer and the inner circumferential hardened layer, the thickness of the softened layer being 0.1 to 0.25 times its outside diameter, and wherein the implement pin is more lightweight than a solid implement pin of the same outside diameter and length by 25 to 65%.

11. The implement coupling device according to claim 9, wherein a resin having good noise absorbability such as urethane foam is disposed in the bore of the implement pin, the implement pin is provided with a lubricating oil feeding hole extending in a radial direction such that the lubricating oil stored in the bore can be fed to a contact surface, and the resin and the lubricating oil coexist.

12. The implement coupling device according to claim 11, wherein both end faces of the implement pin containing a lubricating oil in its bore are sealed by sealing devices either or both of which do not project from the end faces of the implement pin, and the lubricant oil can be fed from either one of the sealing devices.

13. The implement coupling device according to any one of claims 8 to 12, wherein the implement pin is designed such that the lubricating oil feeding hole made in a radial direction does not completely pass through a metal based porous sintered contact material to the other side and the lubricating oil stored in its bore can be fed to the contact surface through pores made in the metal based porous sintered contact material.

14. The implement coupling device according to any one of claims 3 to 5, wherein the metal based porous sintered contact material is holed and the hole is filled with a lubricant as well as a material having good noise absorbability and oil retention ability such as resin, rubber, felt and graphite.

15. The implement coupling device according to any one of claims 3 to 12, wherein the whole implement bushing is constituted by an Fe—Cu based porous sintered contact material and has undergone thermal treatment such as quenching and carburization quenching so as to have a Rockwell C hardness of HRC 45 or more.

16. The implement coupling device according to any one of claims 3 to 12, wherein the whole implement bushing is constituted by an Fe—Cu—Al based porous sintered contact material and contains at least 2 to 30 wt % Al and 15 to 40 wt % Cu.

17. The implement coupling device according to any one of claims 3 to 5, wherein the implement bushing is designed such that the metal based porous sintered contact material is integral with the inner circumference of a cylindrical or substantially cylindrical backing made from steel.

18. An implement coupling device which is composed of an implement bushing made from steel and an implement pin which are for use in an implement for construction equipment, wherein
   a metal based contact material having a porous structure capable of storing at least one of a lubricating oil and a lubricant is interposed in a gap defined by the implement bushing and the implement pin, and wherein
   the metal based porous sintered contact material integral with the implement pin or the implement bushing is an Fe—Cu—Al based porous sintered contact material containing at least 2 to 30 wt % Al and 15 to 40 wt % Cu.

19. An implement coupling device which is composed of an implement bushing made from steel and an implement pin which are for use in an implement for construction equipment, wherein
   a metal based contact material having a porous structure capable of storing at least one of a lubricating oil and a lubricant is interposed in a gap defined by the implement bushing and the implement pin, and wherein
   the metal based porous sintered contact material integral with the implement bushing or the implement pin is a copper based sintered contact material having a Young's modulus lower than 200 gigapascals (GPa).

20. The implement coupling device according to claim 19, wherein the copper based sintered contact material is a Cu—Al based porous sintered contact material having a sinter structure in which at least a hard β phase exists or an α phase and β phase coexist, and the Vickers hardness of the sinter structure is Hv 130 or more.

21. The implement coupling device according to claim 20, wherein the copper based sintered contact material is a Cu—Al—Ti based sintered contact material produced by compacting and sintering a copper based sintered material blended powder containing 5 to 12 wt % Al as an essential element and 0.3 to 5 wt % Ti to form a sintered compact and then repeatedly performing a re-compacting and sintering process on the sintered compact once or more.

22. The implement coupling device according to claim 21, wherein the copper based sintered contact material is a Cu—Al—Sn based sintered contact material containing 5 to 12 wt % Al, 3 to 6 wt % Sn, and 0.5 to 5.0 wt % one or more elements selected from the group consisting of Ti, Ni, Go, Si, Fe, P and graphite.

23. The implement coupling device according to claim 17, wherein the integration of the metal based contact material consisting of the metal based porous sintered contact material with the outer circumference of the implement pin or the inner circumference of the implement bushing is done by sinter-bonding, press fitting, fitting, bonding, brazing or clinching of a green compact, pre-sintered compact or sintered compact which has been processed into a cylindrical or substantially cylindrical shape.

24. The implement coupling device according to claim 23, wherein the outer circumference of the implement pin or the inner circumference of a backing for the implement bushing is grooved and the metal based porous sintered contact material is made to be integral with said outer or inner circumference so as to fit the shape of the groove, thereby preventing the metal based contact material from coming off in an axial direction during operation.

25. The implement coupling device according to claim 17, wherein the implement bushing, in which the metal based contact material is press-fitted or fitted into the bore of its backing, has a sealing device at an inner circumferential surface portion in the vicinity of each end thereof.

26. The implement coupling device according to any one of claims 6 to 12, wherein the metal based contact material is a metal based porous sintered contact material; and
   said metal based porous sintered contact material is holed and the hole is filled with a lubricant as well as a material having good noise absorbability and oil retention ability such as resin, rubber, felt and graphite.

27. The implement coupling device according to claim 1, 2, 6, 7, 8, 9 or 10, wherein the metal based contact material is a metal based porous sintered contact material; and
   the implement bushing is designed such that the metal based porous sintered contact material is integral with the inner circumference of a cylindrical or substantially cylindrical backing made from steel.

* * * * *

UNITED STATES PATENT AND TRADEMARK OFFICE
CERTIFICATE OF CORRECTION

PATENT NO. : 6,962,458 B2  Page 1 of 1
DATED : November 8, 2005
INVENTOR(S) : Takemori Takayama et al.

It is certified that error appears in the above-identified patent and that said Letters Patent is hereby corrected as shown below:

<u>Column 24,</u>
Line 19, "Go" should read -- Co --.

Signed and Sealed this

Eleventh Day of April, 2006

JON W. DUDAS
*Director of the United States Patent and Trademark Office*